(12) United States Patent
Okutomi et al.

(10) Patent No.: US 7,515,747 B2
(45) Date of Patent: Apr. 7, 2009

(54) METHOD FOR CREATING HIGH RESOLUTION COLOR IMAGE, SYSTEM FOR CREATING HIGH RESOLUTION COLOR IMAGE AND PROGRAM CREATING HIGH RESOLUTION COLOR IMAGE

(75) Inventors: Masatoshi Okutomi, Tokyo (JP); Tomomasa Goto, Tokyo (JP)

(73) Assignee: The Circle for the Promotion of Science and Engineering, Tokyo (JP)

( * ) Notice: Subject to any disclaimer, the term of this patent is extended or adjusted under 35 U.S.C. 154(b) by 622 days.

(21) Appl. No.: 10/543,846

(22) PCT Filed: Oct. 8, 2003

(86) PCT No.: PCT/JP03/12868
§ 371 (c)(1),
(2), (4) Date: Jul. 29, 2005

(87) PCT Pub. No.: WO2004/068862
PCT Pub. Date: Aug. 12, 2004

(65) Prior Publication Data
US 2006/0038891 A1    Feb. 23, 2006

(30) Foreign Application Priority Data
Jan. 31, 2003    (JP) .............................. 2003-025221

(51) Int. Cl.
*G06K 9/00* (2006.01)
(52) U.S. Cl. ..................................... 382/167
(58) Field of Classification Search ................ 382/176, 382/299, 312; 348/266, 268, 272, 273
See application file for complete search history.

(56) References Cited

U.S. PATENT DOCUMENTS 4,642,678 A    2/1987    Cok .............................. 358/44

(Continued)

FOREIGN PATENT DOCUMENTS

JP    2002-064835    2/2002

(Continued)

OTHER PUBLICATIONS

R.C. Hardie, et al., "Joint MAP Registration and High-Resolution Image Estimation using a Squence of Undersampled Images," *IEEE Trans. On Image Processing*, vol. 6, pp. 1621-1633 (1997).

(Continued)

*Primary Examiner*—Jose L Couso
(74) *Attorney, Agent, or Firm*—Ladas & Parry LLP

(57) ABSTRACT

A limitation in the physical resolution of an image sensor offers a motivation to improve the resolution of an image. Super-resolution is mainly applied to gray scale images, and it has not been thoroughly investigated yet that a high resolution color image is reconstructed from an image sensor having a color filter array. An object of the invention is to directly reconstruct a high resolution color image from color mosaic obtained by an image sensor having a color filter array. A high resolution color image reconstruction method according to the invention is based on novel technique principles of color image reconstruction that an increase in resolution and demosaicing are performed at the same time. The verification and effective implement of the invention are also described.

37 Claims, 22 Drawing Sheets

U.S. PATENT DOCUMENTS

| | | | |
|---|---|---|---|
| 5,373,322 A | 12/1994 | Laroche | 348/273 |
| 6,690,422 B1 * | 2/2004 | Daly et al. | 348/273 |
| 6,697,109 B1 * | 2/2004 | Daly | 348/268 |

FOREIGN PATENT DOCUMENTS

| | | |
|---|---|---|
| JP | 2002-94999 | 3/2002 |

OTHER PUBLICATIONS

Huang, T.S., et al., "Multiple Frame Image Restoration and Registration," *Advances in Compute Vision and Image Processing*, vol. 1, pp. 317-339 (1984).

Irani, M., et al., "Improving Resolution by Image Registration," *CVGIP: Graph. Models Image Process*, vol. 53, pp. 231-239 (Mar. 1991).

Shimizu, M., et al., "Precise Sub-Pixel Estimation on Area- Based Matching," *Proceedings of 8th IEEE International Conference on Computer Vision (ICCV2001)*, pp. 90-97 (Jul. 2001).

Shin, J., et al., "Adaptive Regularized Image Interpolation Using Data Fusion and Steerable Constraints," *SPIE Visual Communications and Image Processing*, vol. 4310 (Jan. 2001).

* cited by examiner (a) REFERENCE IMAGE (b) INPUT IMAGE
(1/2 DOWNSAMPLING + BAYER CFA)

(a) THE PRESENT INVENTION f=1 M=1

(b) THE PRESENT INVENTION f=1 M=8

(c) THE PRESENT INVENTION f=2 M=1

(d) THE PRESENT INVENTION f=2 M=8

(a) BI-LINEAR (b) KODAK (c) BI-LINEAR × 2

(d) KODAK + BI-CUBIC × 2

REFERENCE IMAGE (256 × 320)

INPUT IMAGE

1/2 DOWNSAMPLING + BAYER CFA

BI-LINEAR

KODAK + BI-CUBIC

THE PRESENT INVENTION M=16

INPUT IMAGE
1/4 DOWNSAMPLING + BAYER CFA

BI-LINEAR

KODAK + BI-CUBIC

THE PRESENT INVENTION M=64

(a) INPUT IMAGE (b) RECONSTRUCTED
IMAGE BY TRADITIONAL
METHOD (c) RECONSTRUCTED
IMAGE BY TRADITIONAL
METHOD (d) RECONSTRUCTED
IMAGE BY THE PRESENT
INVENTION f=4, M=64

FIG.22

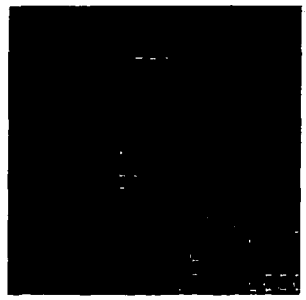
(a1) INPUT IMAGE

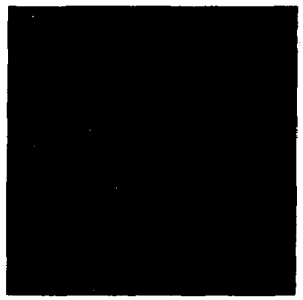
(a2) INPUT IMAGE

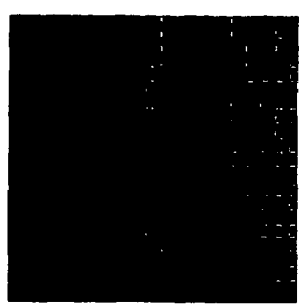
(a3) INPUT IMAGE

(b1) RECONSTRUCTED IMAGE BY TRADITIONAL METHOD

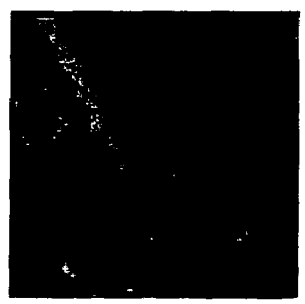
(b2) RECONSTRUCTED IMAGE BY TRADITIONAL METHOD

(b3) RECONSTRUCTED IMAGE BY TRADITIONAL METHOD

(c1) RECONSTRUCTED IMAGE BY TRADITIONAL METHOD

(c2) RECONSTRUCTED IMAGE BY TRADITIONAL METHOD

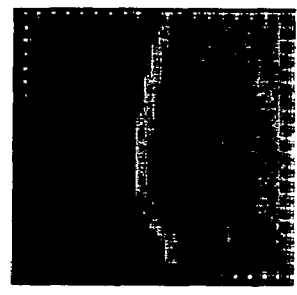
(c3) RECONSTRUCTED IMAGE BY TRADITIONAL METHOD

(d1) RECONSTRUCTED IMAGE BY THE PRESENT INVENTION f=4, M=64

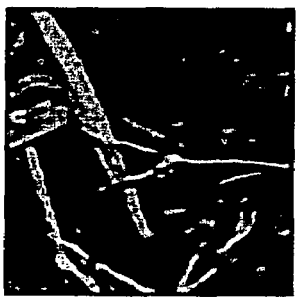
(d2) RECONSTRUCTED IMAGE BY THE PRESENT INVENTION f=4, M=64

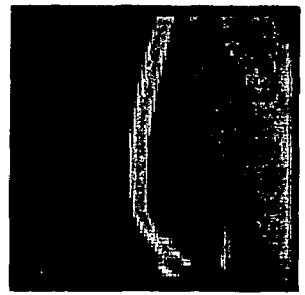
(d3) RECONSTRUCTED IMAGE BY THE PRESENT INVENTION f=2, M=16

METHOD FOR CREATING HIGH RESOLUTION COLOR IMAGE, SYSTEM FOR CREATING HIGH RESOLUTION COLOR IMAGE AND PROGRAM CREATING HIGH RESOLUTION COLOR IMAGE

TECHNICAL FIELD

The present invention relates to a image reconstruction method, a image reconstruction apparatus and a image reconstruction program, particularly to a high resolution color image reconstruction method, a high resolution color image reconstruction apparatus and a high resolution color image reconstruction program for reconstructing a high resolution color image from a single-chip CCD array.

BACKGROUND TECHNIQUE

In a single-chip color camera, each pixel of a CCD is covered with color filter. Red, Green, and Blue are typical colors used for color filter. The color filters are arranged in a mosaic pattern, and only one primary color is captured for every pixel. The mosaic pattern is referred to as a CFA ("CFA" means Color Filter Array) pattern. Therefore, data obtained through a CFA is an image in color mosaic, and it is imperfect as a full color image.

In order to produce a full color image, missing color channels need to be estimated from raw data of color mosaic. Generally, this color reconstruction process is referred to as demosaicing. The simplest demosaicing method is linear interpolation applied to every color channel. More sophisticated demosaicing methods (see Reference Literatures [1] and [2]) have also been reported, which have the accuracy of image reconstruction higher than that of linear interpolation.

Generally, the major problem in demosaicing is false colors that occur in the resulting color image. Although an image is filtered through an optical low-pass filter to reduce false color, it results in causing a problem that band limitation is interposed. Particularly, when an image is magnified for display on a high resolution screen, a problem arises that the degradation of image quality caused by band limitation is noticeable.

The resolution of a color image reconstructed by the demosaicing method is equal to the physical resolution of a CCD. For example, in the case of display, printing, post-processing, etc., a much higher resolution is required. Interpolation is a traditional solving method for such demands.

However, when compared with an image obtained by a CCD having higher resolution, interpolation results in a low quality image. This is caused that the interpolation process does not substantially add information. Interpolation has a problem that it cannot reconstruct the detail of the image. In other words, interpolation cannot reconstruct high frequency signals.

Super-resolution (see Reference Literatures [3] to [5]) is a method different from interpolation, and super-resolution can detailedly reconstruct high frequencies contained in a captured scene. Super-resolution is an image processing technique that combines a high resolution image from multiple low resolution images. Among various methods for super-resolution in literatures, a frequency domain method that had proposed by Tsay and Huang first proposed a theory of super-resolution (see Reference Literature [3]). Peleg et al. proposed a spatial domain method based on a recursive back projection method (see Reference Literature [4]). First, image capturing process of a high resolution image is simulated to generate a measurement value, and simulation error is used for updating temporary image estimation error.

Up to now, super-resolution has been applied for gray scale images or full color images, but it has not been yet applied to raw data obtained by a single-chip CCD. Although demosaicing and super-resolution are sequentially executed to obtain a high resolution color image, such methods cause damage because of false color and blur effect seen in a demosaiced image. Since data available for a user is a demosaiced (and also compressed) image, such damage is often seen when a consumer camera is used.

The invention has been made in view of the circumstances described above. An object of the invention is to provide a high resolution color image reconstruction method, a high resolution color image reconstruction apparatus, and a high resolution color image reconstruction program, which can overcome the limitation described above, and directly use a raw color mosaic image captured by a CFA-masked CCD to reconstruct a high resolution color image from a single-chip CCD array.

The invention is characterized by a single step process for offering a spatial resolution higher than the physical resolution of a CCD. Accordingly, the invention allows an effective integration of demosaicing and an increase in resolution.

DISCLOSURE OF THE INVENTION

A high resolution color image reconstruction method according to the invention is a high resolution color image reconstruction method which reconstructs a high resolution color image based on a single input image or a sequence of multiple input images captured by an image capturing device employing an image sensor and a color filter array, said high resolution color image reconstruction method comprising the steps of: reconstructing said high resolution color image having a predetermined resolution equal to or larger than a physical resolution of said image capturing device, and conducting known or unknown geometric transformation between said sequence of multiple input images; and reconstructing said high resolution color image in which even a high spatial frequency component contained in said subject is truly reproduced and occurrence of false color is suppressed by conducting an optimization process of an evaluation function.

Furthermore, said evaluation function according to the invention is comprised of: a first term which evaluates fidelity of said high resolution color image being an estimated image with respect to said input images by using an image formation model expressing generation of said high resolution color image from said input images; a second term which evaluates smoothness in said estimated image by penalizing said estimated image within which neighboring pixel values change abruptly in said input images; and a third term which evaluates smoothness of chrominance of said estimated image by penalizing said estimated image within which chrominance components change abruptly in said input images. Said second term serves to obtain a smooth estimated image with preserved edges; and said third term serves to obtain a smooth estimated image with local chrominance continuity and preserved edges. Alternatively, it further comprises the step of estimating geometrical transform between said input images at the same time as said high resolution color image. Therefore, the invention is effectively achieved.

Moreover, a high resolution color image reconstruction apparatus according to the invention is a single-chip image capturing device employing a single-chip capturing element and using said high resolution color image reconstruction method according to the invention. Therefore, the invention is achieved.

BRIEF DESCRIPTION OF THE DRAWINGS

FIG. 22 is a diagram illustrating experimental results using images whose subject is nature (hereinafter referred to as "nature-image").

BEST MODE FOR CARRYING OUT THE INVENTION

Figure 1:
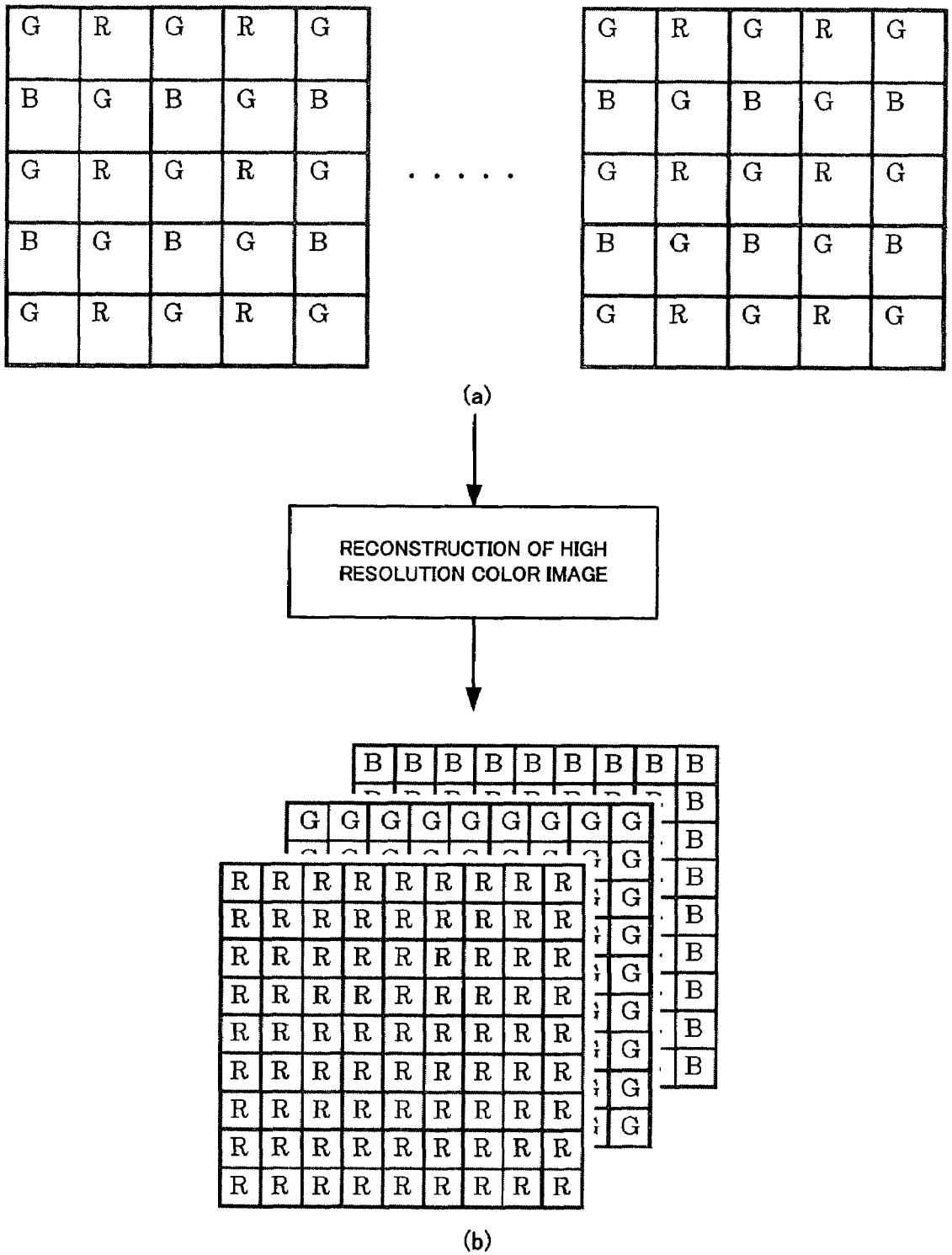
FIG. 1 is a diagram illustrating an exemplary flow of a signal process used in the invention.

Hereinafter, preferred embodiments according to the invention will be described with reference to the drawings and equations.

<1> Observation Model

<1-1> Introduction

For example, consider a single raw image or multiple raw images captured by an image capturing device such as a digital camera. A single captured image is the result that geometrical transform with respect to an absolute coordinate system, blur effect by an optical system and the aperture of a CCD, downsampling, and CFA masking are applied to a true image (that, is, a captured scene).

<1-2> Image Formation Model

Here, modeling is started without consideration of CFA effect. In this section, a gray scale image is considered.

In an image formation model for an image capturing system, an input image is continuous, whereas output data ("output data" referred here means a CFA masked raw image) is discrete. Thus, it can be expressed by a continuous-discrete model.

The image formation model for the image capturing system can be expressed by the following Equation 1.

$$u(i_1,i_2)=\int\int p(i_1-x,i_2-y)I(x,y)dxdy \quad \text{[Equation 1]}$$

Where $u(i_1,i_2)$ expresses a digital image captured by a CCD, and $I(x,y)$ expresses a true image (scene). $(i_1,i_2)$ is a discrete coordinate system, and $(x,y)$ is a continuous coordinate system. $p(x,y)$ is a point spread function. PSF ("PSF" means a point spread function) is derived from optical transfer characteristics formed of an optical system and a CCD aperture in the image capturing system, but in practice, it can be approximately modeled by a Gaussian function expressed by the following Equation 2.

$$p(x, y) = \frac{1}{\sqrt{2\pi}\,\sigma} \exp\left\{-\frac{x^2+y^2}{2\sigma^2}\right\} \quad \text{[Equation 2]}$$

Where $\sigma^2$ is a variance.

Integration in Equation 1 is performed with respect to $(x, y)$.

Consider coordinate transformation from $(x,y)$ to $(\xi,\eta)$. Where $(\xi,\eta)$ is coordinates where a high resolution image is defined.

For example, it can be considered that a three-parameter model having the following parameter expresses the translation and rotational motion of the entire image.

$$r=[\delta_x,\delta_y,\theta] \quad \text{[Equation 3]}$$

Coordinate transformation is expressed in the following model.

$$s(\xi, \eta) = \frac{1}{f}\begin{bmatrix}\cos\theta & -\sin\theta \\ \sin\theta & \cos\theta\end{bmatrix}\begin{bmatrix}\xi \\ \eta\end{bmatrix}+\begin{bmatrix}\delta_x \\ \delta_y\end{bmatrix} \quad \text{[Equation 4]}$$

Where $\theta$ is a rotation angle, and $\delta_x,\delta_y$ are a horizontal component and a vertical component of translation, respectively. f is a resolution enlargement ratio that can be specified freely.

When the coordinate transformation $(x,y)=s(\xi,\eta)$ is used, the Equation 1 becomes the following Equation 5.

$$u(i_1, i_2) = \int\int_p ((i_1, i_2) - s(\xi, \eta))I(x, y)\left|\frac{\partial s}{\partial(\xi, \eta)}\right|d\xi\,d\eta \quad \text{[Equation 5]}$$

In order to obtain discrete approximation of a model expressed by Equation 5, suppose true image $I(x,y)$ is constant in the entire area that covers high resolution pixels positioned at lattice points $(j_1,j_2)$ of high resolution. Thus, the integration of Equation 5 can be written in the form of Equation 6.

$$u(i_1, i_2) = \sum_{j_1} \sum_{j_2} z(j_1, j_2) h(i_1, i_2, j_1, j_2; s) \quad \text{[Equation 6]}$$

Where $z(j_1,j_2)$ is a constant value of the assumed true image $I(x,y)$. Furthermore, Equation 7 is as below.

$$h(i_1, i_2, j_1, j_2; s) = \quad \text{[Equation 7]}$$
$$\int_{j_1-1/2}^{j_1+1/2} \int_{j_2-1/2}^{j_2+1/2} p(s(\xi,\eta)-(i_1,i_2)) \left| \frac{\partial s}{\partial(\xi,\eta)} \right| d\xi d\eta$$

The integration of Equation 7 is performed with respect to the entire area that covers the high resolution pixels positioned at $(j_1,j_2)$. The model expressed by Equation 6 is referred to as "zeroth-order hold". Different modeling other than the zeroth-order hold is possible, and for example, linear approximation, higher order approximation, etc. can be considered.

Equation 6 can be expressed by a matrix vector notation. When a lexicographic notation is used for images $u(i_1,i_2)$ and $z(j_1,j_2)$, Equation 6 becomes the following Equation 8.

$$u = H(s)z \quad \text{[Equation 8]}$$

Where u and z are column vectors having the same size as the number of pixels in $u(i_1,i_2)$ and $z(j_1,j_2)$, respectively.

$H(s)$ is matrix expression $h(i_1,i_2,j_1,j_2;s)$ that associates u with z.

<1-3> Color Filter Array (CFA)

A color image can be expressed by multiple color channels of two-dimensional signals. Red, Green, and Blue are often used for a consumer camera such as a 3CCD digital still camera.

Let us expand the image formation model for the image capturing system described above (in the invention, it is also referred to as an image capturing model) to a color image. It can be considered that the model expressed by Equation 8 is a model for a single color channel. Therefore, an image formation model for each color channel can be similarly expressed.

$$u_c = H_c(s) z_c \quad \text{[Equation 9]}$$

Where matrix $H_c(s)$ expresses an image formation model for color channel $c \in \{R,G,B\}$. Practically, matrices $H_R(s)$, $H_G(s)$, $H_B(s)$ can often be approximated by the same matrix $H(s)$.

In the single-chip CCD camera, a color image is masked by CFA to generate color mosaic. In FIG. 1(a), a single image therein shows CFA that is well known as a Bayer pattern. This process is modeled as sampling applied to a color image u by CFA.

Consider a single two-dimensional arrangement including 1 or 0 at every element. The element having value 1 has sensitivity with respect to color $c \in \{R,G,B\}$. The arrangements below show a sampling arrangement for a Bayer pattern. More specifically, these sensitivity arrangements express a Bayer pattern having an image size of 5×5.

$$m_R(i,j): \begin{pmatrix} 0 & 1 & 0 & 1 & 0 \\ 0 & 0 & 0 & 0 & 0 \\ 0 & 1 & 0 & 1 & 0 \\ 0 & 0 & 0 & 0 & 0 \\ 0 & 1 & 0 & 1 & 0 \end{pmatrix} \quad \text{[Equation 10]}$$

$$m_G(i,j): \begin{pmatrix} 1 & 0 & 1 & 0 & 1 \\ 0 & 1 & 0 & 1 & 0 \\ 1 & 0 & 1 & 0 & 1 \\ 0 & 1 & 0 & 1 & 0 \\ 1 & 0 & 1 & 0 & 1 \end{pmatrix} \quad \text{[Equation 11]}$$

$$m_B(i,j): \begin{pmatrix} 0 & 0 & 0 & 0 & 0 \\ 1 & 0 & 1 & 0 & 1 \\ 0 & 0 & 0 & 0 & 0 \\ 1 & 0 & 1 & 0 & 1 \\ 0 & 0 & 0 & 0 & 0 \end{pmatrix} \quad \text{[Equation 12]}$$

The sampling arrangements for image sensors (in the embodiment, a CCD capturing element) using other CFA patterns can be similarly configured.

When consider vector expressions $m_R(i,j), m_G(i,j), m_B(i,j)$, the following Equation 13 is made.

$$m_R = (0,1,0,1,0,0,0,\ldots 0)$$
$$m_G = (1,0,1,0,1,0,1,\ldots 1)$$
$$m_B = (0,0,0,0,0,1,0,\ldots 0) \quad \text{[Equation 13]}$$

The sampling by CFA can be expressed by a form of the following diagonal matrix.

$$M_c = \text{diag}(m_c) \quad \text{[Equation 14]}$$

Where $c \in \{R,G,B\}$.

As described above, the sampling model by CFA is given by effecting matrices to full color image $u_c$.

$$y_c = M_c u_c \quad \text{[Equation 15]}$$

Where $y_c$ includes pixel values in raw data captured by a CFA masked CCD. An overall forward model for a single-chip CCD is written in the following form by using the above Equation 9 and Equation 15.

$$\begin{bmatrix} y_R \\ y_G \\ y_B \end{bmatrix} = \text{diag}(M_R H_R(s), M_G H_G(s), M_B H_B(s)) \begin{bmatrix} z_R \\ z_G \\ z_B \end{bmatrix} \quad \text{[Equation 16]}$$

<1-4> Multi-Frame Observation Model

Consider a sequence of raw color mosaic images captured by a single-chip CCD. An expression in consideration of geometric transformation with respect to Equation 16 can be used.

$$\begin{bmatrix} y_R \\ y_G \\ y_B \end{bmatrix}_k = \text{diag}(M_R H_R(s_k), M_G H_G(s_k), M_B H_B(s_k)) \begin{bmatrix} z_R \\ z_G \\ z_B \end{bmatrix} \quad \text{[Equation 17]}$$

Where $S_\kappa$, $\kappa = 1, \ldots, M$ expresses the coordinate transformation in Equation 5, with respect to each frame in an image column.

In Equation 17, consider stack expression of vectors, and then it is the following Equation 18.

$$y_k = A_k z \quad \text{[Equation 18]}$$

Where $A_k$ is a block diagonal matrix on the right side of Equation 17 that expresses the relationship between a high resolution image and an observed frame.

Vector $y_k$ includes pixel values that are not observed by Z. It should be noted that a valid row for $A_k$ is a row that corresponds to elements for $y_k$ that are observed from elements having compensated motion of z. The remaining invalid rows are removed to generate a system of a reduced equation. Thus, this process removes elements that do not have meanings as input data.

Now, suppose there is a sequence of equations that expresses an image capturing model for multiple images having M input images.

$$y_1 = A_1 z \quad \text{[Equation 19]}$$
$$\vdots$$
$$y_k = A_k z$$
$$\vdots$$
$$y_M = A_M z$$

When stacked equations are used, the following Equation 20 is made.

$$y = Az + n \quad \text{[Equation 20]}$$

On the right side of the above Equation 20, an additional term that expresses noise is considered. A is a forward observation model in the entire image capturing process for image sequence, which is referred to as a system matrix in the invention.

<2> Formulation of Problems

<2-1> Introduction

In the invention, a greatest object is to provide a novel high resolution color image reconstruction method, a reconstruction apparatus and a reconstruction program, in which a raw color mosaic image captured by an image capturing device using an image sensor (in the embodiment, a single-chip CCD) and a color filter array can be input to directly reconstruct a full color high resolution image as output. The important technique principles in the invention that adopts this direct method are to incorporate priori knowledge about the correlation between color channels into image reconstruction problems.

In the invention, multi-channel constraint uses operators in order to model piecewise smooth data in color channels, and includes a spectral energy function in order to reveal the correlation between cross channels.

<2-2> Image Reconstruction as an Inverse Problem

The image reconstruction method (it is also referred to as an image generation method) according to the invention aims to obtain a high resolution image from a low resolution image or a sequence of several low resolution images. However, this often turns to an ill-posed inverse problem. Therefore, it is necessary to this application to include a priori constraint. This ensures the image estimation that is acceptable under conditions of limited data or bad quality data.

An estimated image for $z_t$ can be obtained by solving an inverse problem with the forward observation model discussed in the above section. When an optimization approach that is made appropriate to solving the inverse problem is applied, the following Equation 21 is obtained.

$$\hat{z} = \arg\min_z \{f_1(z) + \lambda f_p(z)\} \quad \text{[Equation 21]}$$

Where:

$$f_1(z) = \|y - Az\|^2 = \sum_{k}^{M} \|y_k - A_k z\|^2 \quad \text{[Equation 22]}$$

Parameter λ controls a weight between a priori constraint and the compatibility of observed data.

An energy function formed of two terms, which expresses the correlation between a space and a spectrum, is as below.

$$f_p(z) = f_2(z) + \mu f_3(z) \quad \text{[Equation 23]}$$

Where $f_2(z)$ expresses spatial energy, and $f_3(z)$ expresses spectral energy. Parameter μ adjusts a relative significance between two terms.

<2-3> Spatial Energy Function

Generally, piecewise smoothness can be assumed for every color channel. This assumption is incorporated into the spatial energy function, and then much higher priority can be obtained as a signal is smoother.

The model below expresses the correlation between spaces.

$$f_2(z) = \|Pz\|^2$$

Where P is a linear operator being differential approximation with respect to a Laplacian operator applied to every color channel.

The function expressed by Equation 24 expresses spatial activity. In a smooth image, $f_2(z)$ is a small value, whereas $f_2(z)$ is great with respect to an image having an edge. $f_2(z)$ gives penalty to discontinuity in an image. In this model, a smooth signal is matched with spatial assumption to provide high performance.

<2-3-1> Edge Preserving Operator

The above described appropriateness model serves as a function as constraint for smoothness. The constraint results in an estimated image unnecessarily smoothed. In order to cope with this problem, edge preserving constraint can be used in image estimation.

Consider an edge detection function that provides edge direction in an image. Quadratic differential is applied in different directions to select a direction that minimizes the detection function for every pixel, and then an edge direction map is generated.

Accordingly, an adaptive operator that evaluates quadratic differential in the edge direction for every pixel serves as edge preserving constraint, and Equation 24 can be replaced.

<2-4> Spectral Energy Function

Each color plane contains edges of an object that have high connection and are matched at positions with each other. The correlation can be explained by in terms of another color space. Consider a color space decomposition into luminance component and chrominance component.

$$\begin{bmatrix} z_R \\ z_G \\ z_B \end{bmatrix} = \begin{bmatrix} I \\ I \\ I \end{bmatrix} z_L + \begin{bmatrix} z_p \\ z_q \\ z_r \end{bmatrix} \quad \text{[Equation 25]}$$

Where I is a unit matrix, $z_L$ is a luminance signal component for Z, and $[z_p, z_q, z_r]^T$ is a chrominance signal component for z. The luminance signal is defined so as to express light intensity. Linear combination of the RGB signals provides luminance.

$$z_L = \alpha z_R + \beta z_G + \gamma z_B \quad \text{[Equation 26]}$$

Coefficients are set as below.

$\alpha = 1/3$, $\beta = 1/3$, $\gamma = 1/3$

In a specific example using a Bayer CFA pattern, a weight can be placed on a green channel that includes the greatest information in CFA. For example, for a Bayer pattern, coefficients can be set so as to be $\alpha=0$, $\beta=1$, $\gamma=0$ or $\alpha=1/4$, $\beta=1/2$, $\gamma=1/4$.

Equation 25 and Equation 26 decide the following transformation relating to the RGB signals and the chrominance signals.

$$\begin{bmatrix} z_p \\ z_q \\ z_r \end{bmatrix} = T \begin{bmatrix} z_R \\ z_G \\ z_B \end{bmatrix} \quad \text{[Equation 27]}$$

Where Equation 28 is an RGB-chrominance transformation matrix.

$$T = \begin{bmatrix} (1-\alpha)I & -\beta I & -\gamma I \\ -\alpha I & (1-\beta)I & -\gamma I \\ -\alpha I & -\beta I & (1-\gamma)I \end{bmatrix} \quad \text{[Equation 28]}$$

Function $f_3(z)$ gives penalty to sudden change in the chrominance signal.

$$f_3(z) = \|QTz\|^2 \quad \text{[Equation 29]}$$

Where Q is a linear operator being differential approximation with respect to a Laplacian operator applied to every chrominance signal.

This results in that the estimated image where the chrominance signal is resulted to have local continuity obtains much higher priority. In order to derive a desirable estimated image, coefficients in color space transformation can be corrected.

Since chrominance is the difference between luminance and the RGB signals (see Equation 25), a spectral energy function detects the correlation between these signals. Therefore, the spectral energy function takes into account of correlation characteristics between luminance and chrominance, and provides a ground for a signal process between color channels.

For a Bayer CFA, color correlation constraint functions properly when the window size of a kernel for filter Q is set to 3f×3f, where f is a resolution enlargement ratio. When the number of input images that can be used is small, this process is particularly necessary. When the window size is not properly adjusted, there is a tendency to show false color.

The edge preserving operator analog to the edge preserving operator used for the spatial energy function can also be used for the spectral energy function.

<3> Parameter Estimation and an Optimization Technique

<3-1> PSF Estimation

In order to construct an observation model, it is necessary to determine the point spread function described above.

The knowledge of the optical system and the CCD aperture of the image capturing device can theoretically derive PSF.

An edge image or an edge spread function can be used to experimentally estimate PSF as well.

Rough estimation with respect to PSF is also possible, and the resulting estimated image is tested to bring much better estimation with respect to PSF.

<3-2> Motion estimation

Geometrical transform $s_k$ in the observation model has to be identified prior to the image reconstruction process. Resolution enlargement requires motion estimation having sub-pixel accuracy. The greater a desired resolution enlargement ratio is, the greater limitation this requirement puts on image reconstruction.

Furthermore, the computation efficiency and reliability of a motion estimation method is an important problem in implement. A simple motion model having a fewer number of parameters is suitable for this requirement.

A block matching technique based on interpolation provides motion estimation in subpixels. In one of well-known approaches, image data itself is interpolated, and then the block matching technique is applied. Another approach interpolates a matching criterion such as the sum of square differences (SSD) error, the sum of absolute differences (SAD) error, and a cross-correlation function (CC).

Shimizu et al. proposed a novel subpixel matching technique (EEC method) (see Reference Literature [6]). The method can be used in the invention. As compared with the traditional technique based on interpolation of matching criteria, the EEC method can reduce estimation error. In order to cancel estimation error, anti-phase estimation is used in the method. Another advantage of the method is to have much higher computation efficiency than the method that interpolates image data itself.

<3-3> Steepest Descent Optimization

By Equation 21, a high-resolution estimated image can be obtained by minimizing the following objective function (in the invention, this objective function is also referred to as an evaluation function).

$$f(z) = f_1(z) + af_2(z) + bf_3(z) \quad \text{[Equation 30]}$$

Where $a=\lambda$ or $b=\lambda\mu$ is held.

This is expressed as a large-scale optimization problem, and a large-sized system matrix causes a problem in implement step.

A recursive method is well suitable for this optimization. The steepest descent technique is used to give the following recursive update with respect to a high resolution image.

$$z^{(n+1)} = z^{(n)} + \alpha^{(n)} d^{(n)} \quad \text{[Equation 31]}$$

$$d^{(n)} = \left. \frac{\partial f(z)}{\partial z} \right|_{z=z^{(n)}} \quad \text{[Equation 32]}$$

Where n means the n-th repetition. $d^{(n)}$ is a gradient of the objective function. The step size $\alpha^{(n)}$ is adjusted for stable computation. The first image estimation $z^{(0)}$ can be obtained by interpolating $y_1$.

Here, in the embodiment, the steepest-descent method is used as the optimization technique, but the optimization technique used in the invention is not limited thereto, and the other optimization techniques can be used as well.

<3-4> Flow of a Signal Process in the Invention

FIG. 1 shows an exemplary flow of a signal process used in the invention. FIG. 1(a) shows input image sequence of a raw color mosaic image captured through a Bayer color filter array. The high resolution color image reconstruction method according to the invention is used to reconstruct a high resolution full color image shown in FIG. 1(b) from data of the input image sequence shown in FIG. 1(a).

Figure 2:
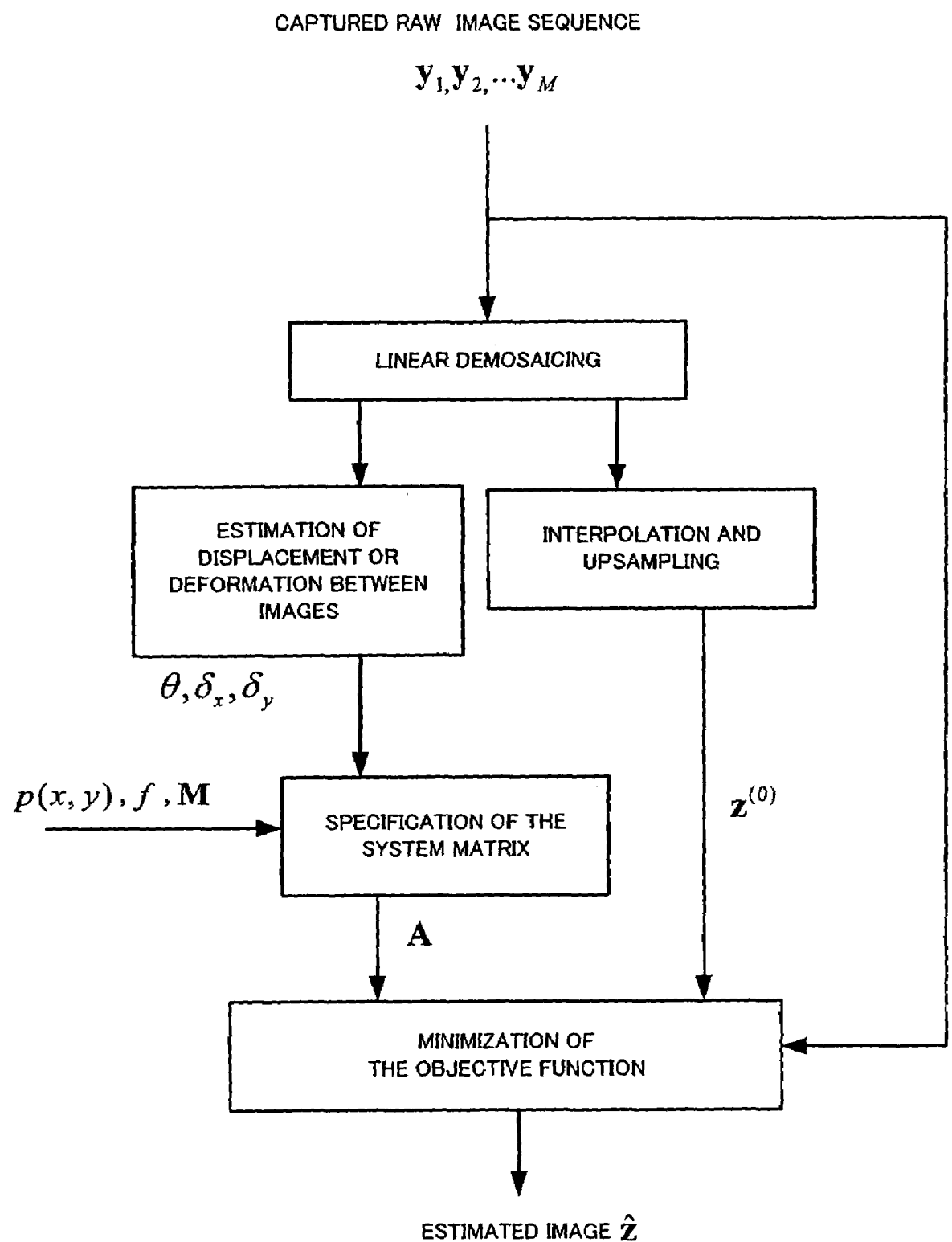
FIG. 2 is a flow chart illustrating an overall process of the invention.

In FIG. 2, a flow of the overall process of the high resolution color image reconstruction method according to the invention is shown in detail. First, raw color mosaic image sequence can be obtained from a single-chip CCD. Subsequently, simple demosaicing is performed that applies linear interpolation for every color channel. Then, motion estimation is applied to a predetermined color channel (in the embodiment, a Green channel). In the embodiment, since a Bayer color filter array is used, a predetermined color channel is a green channel. However, when the other CFAs are used, the other color channels decided based on that CFA are to be used.

After color space transformation, a luminance signal can be used instead of motion estimation. The estimated motion parameter and the specified resolution enlargement ratio f can be used for constructing system matrix W along with PSF and CFA patterns. Since a recursive minimization process of the objective function requires the initial value $z^{(0)}$ of a high resolution estimated image, the high resolution image is set to the initial value $z^{(0)}$ in which a single input image having undergone the linear demosaicing process goes through a preparation process for interpolation, and up sampled for reconstruction.

Figure 3:
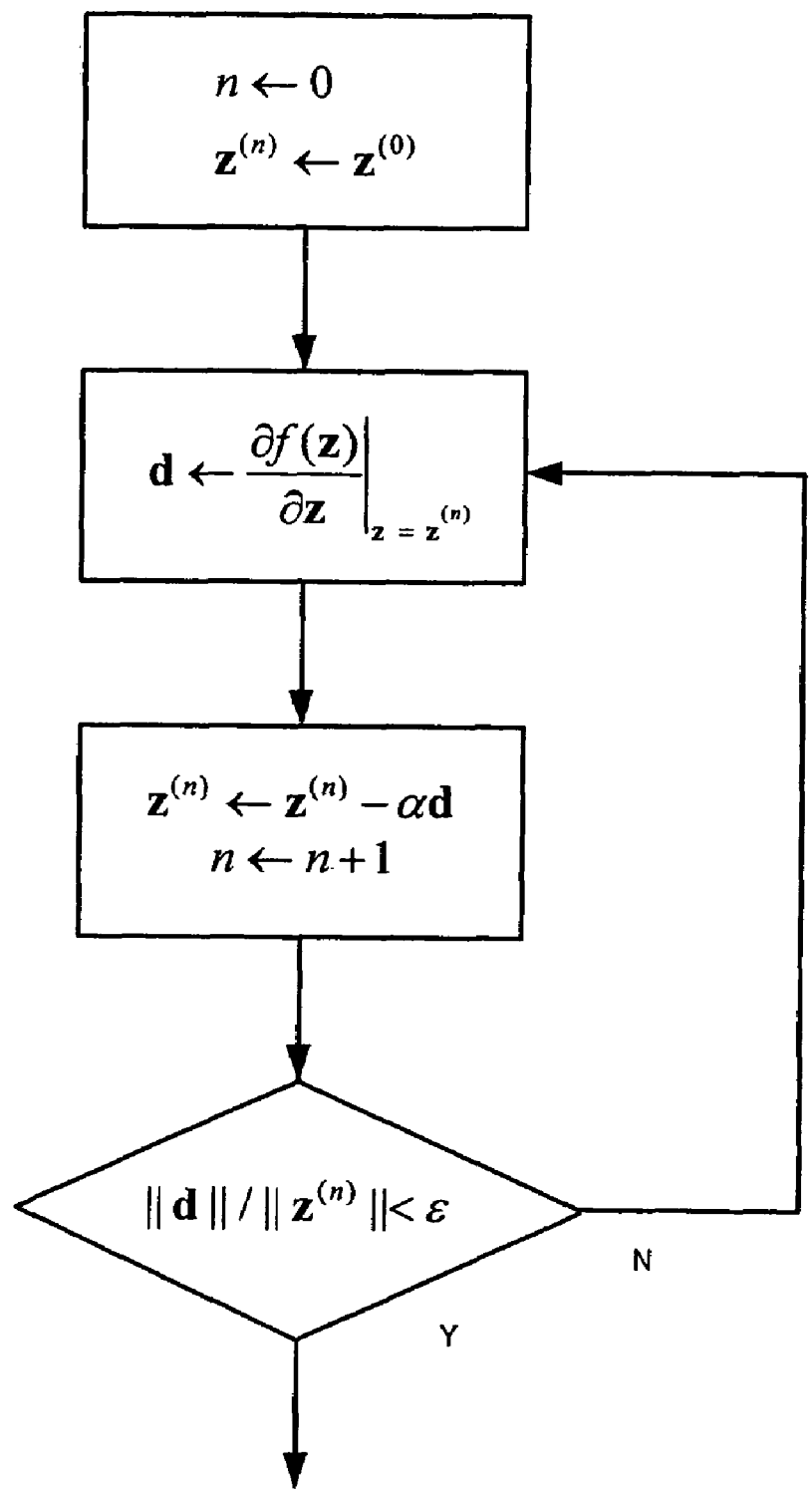
FIG. 3 is a flow chart illustrating steepest-descent method used in a recursive minimization process of an objective function shown in FIG. 2.

Finally, the initial value of the estimated image is updated through the recursive minimization process of the objective function (in the embodiment, it is the steepest-descent method described in detail in FIG. 3). Since the objective function is a quadratic equation, the computation of the gradient is simple. When the estimated image $\hat{z}$ is converged, or the specified conditions expressed in Equation 33 are satisfied, repetition is terminated. The estimated image $\hat{z}$ can be obtained by the recursive minimization process of the objective function.

$$\|d^{(n)}\|/\|z^{(n)}\| < \epsilon \quad \text{[Equation 33]}$$

Where $\epsilon$ is a threshold.

<4> Combination of High Resolution Color Images

Another embodiment according to the invention will be disclosed as below.

First, based on the forward observation model described above, inverse problem analysis is conducted to estimate a high resolution image. When an optimization method of the objective function added with a regularization term (in the invention, it is also referred to as an evaluation function) is used, the high resolution color image $\hat{z}$ to be estimated is given by the following Equation 34.

$$\hat{z} = \arg\min_z \{f_1(z) + f_P(z)\} \quad \text{[Equation 34]}$$

Where a first term of the objective function is the term that expresses goodness of fit to measured data:

$$f_1(z) = \sum_{k=1}^{M} \|y_k - A_k z\|^2 \quad \text{[Equation 35]}$$

The second term of the objective function is a regularization term. It can be considered that the regularization term is an evaluation equation which expands a term having been used for super-resolution of gray scale images and evaluating the local smoothness of a signal to a color signal.

Generally, in a nature-image, it is known that each component of the RGB signals has a strong positive correlation and edge positions are also matched. Therefore, it is undesirable to use independent evaluation equations for individual color channels. For example, when an evaluation equation having smoothing effect is used (independently) for the individual RGB signals, a color shift is generated.

This phenomenon is generated by the same cause as false color seen in an image applied to linear demosaicing. More specifically, it is the cause that the individual color channels having different sampling positions are independently interpolated to vary the correlation between the RGB signals greatly. This is caused that each color channel of raw data is not densely sampled as 3CCD. Accordingly, when input images $y_1, \ldots, y_M$, (M>2) where multiple positions are shifted are obtained in Equation 35, the same effect as doing dense sampling can be obtained, and the generation of color shifts can be reduced. It is revealed that this is almost the same as the fact that a 3CCD image is virtually obtained. Color shifts are to be reduced as input images where multiple positions are shifted are more sufficiently obtained and Equation 35 comes closer to over-determined.

However, it is in fact confirmed that false color is generated even though Equation 35 is over-determined. The causes are that independent noise enters each color channel and that the estimation of the position shift between input images is inaccurate. Moreover, in the invention, the color shift caused by the influence of chromatic aberration is not considered.

In order to suppress the generation of such false color, it is suitable to use a color space having a color component of small correlation than that of RGB. Then, consider the following transformation from RGB space to YCbCr space.

$$z_y = 0.299 z_R + 0.587 z_G + 0.114 z_B$$

$$z_{Cb} = -0.1687 z_R - 0.331 z_G + 0.5 z_B$$

$$z_{Cr} = 0.5 z_R - 0.4187 z_G - 0.0813 z_B \quad \text{[Equation 36]}$$

With the use of the above transformation, the regularization term is defined by terms for a luminance component and a chrominance component.

$$f_P(z) = f_2(z_y) + f_3(z_{Cb}, z_{Cr}) \quad \text{[Equation 37]}$$

In a nature-image, the variation in the chrominance component is smaller than that in the luminance component, and the greatest information is included in the luminance component. Furthermore, in many applications, it is demanded that the structure of a subject expressed by luminance information is expressed in higher definition than color information. Moreover, from a reason that a human visual system is relatively low in sensitivity with respect to color variation, the following conditions are taken into the regularization term.

First, for luminance, an edge preserving anisotropic smoothness condition is taken into the regularization term to prevent the structure of a subject from degrading due to excessive smoothing. For a smoothness condition that satisfies this requirement, a regularization operator is used that smoothes in the direction along with an edge (see Reference Literature [7]). More specifically, it is expressed by the following Equation 38 using a high-pass operator $P_d$, $d \in D$ that evaluates smoothness in direction D in each pixel: {horizontal, vertical, and diagonal (two ways) directions, no direction (equal to all directions).

$$f_2(z_Y) = \sum_{d \in D} \|\Lambda_d P_d z_Y\|^2 \quad \text{[Equation 38]}$$

Each element in diagonal matrix $\Lambda_d$ expresses a weight with respect to a high-pass operation in the edge direction d in each pixel $z_y$. The weight is determined by detecting the edge direction and intensity in each pixel.

On the other hand, the regularization term on chrominance considers isotropic smoothness. This is because when the number of input images is small and Equation 35 is underdetermined with respect to an unknown, an anisotropic smoothness condition is given to chrominance, and then it is difficult to estimate the true edge direction. The following regularization term using isotropic high-pass filter H is defined.

$$f_3(z_{Cb}, z_{Cr}) = \lambda_c (\|H z_{Cb}\|^2 + \|H z_{Cr}\|^2) \quad \text{[Equation 39]}$$

Where $\lambda_c$ is a weighting parameter.

Even when Equation 35 is over-determined, false color is generated that is caused by motion estimation error and color channel independent noise. Therefore, the above regularization term expressed by Equation 39 serves an important role in color image reconstruction.

The cut-off frequency of the high-pass filter is set to a color channel band where the sampling intervals of a color filter are the coarsest, and thus false color can be suppressed. When multiple input images are given and Equation 35 comes close to over-determined, a greater cut-off frequency is set to suppress the excessive smoothing of chrominance. In addition, in an experiment described later, a Gaussian high-pass filter (that, is, a filter that can give frequency characteristics by $H(u,v) = 1 - \exp(-(u^2 + v^2)/2\sigma^2_c))$ is used, and a regularization operator that the standard deviation is the cut-off frequency is used.

It can be verified by an experiment described later that the regularization term with respect to the above-described chrominance has the property of suppressing the edge shift between the color channels. First, for a model of the edge portion where two color areas are adjacent in an image, consider the following one-dimensional RGB signals.

$$z_R(j) = \text{erf}(j) + 2,$$

$$z_G(j) = a_1 z_R(j - Dg) + b_1,$$

$$z_B(j) = a_2 z_R(j - Db) + b_2 \quad \text{[Equation 40]}$$

erf(•) expresses an error function:

$$\text{erf}(\xi) = \frac{2}{\sqrt{\pi}} \int_0^\xi \exp(-t^2) dt$$

Figure 4:
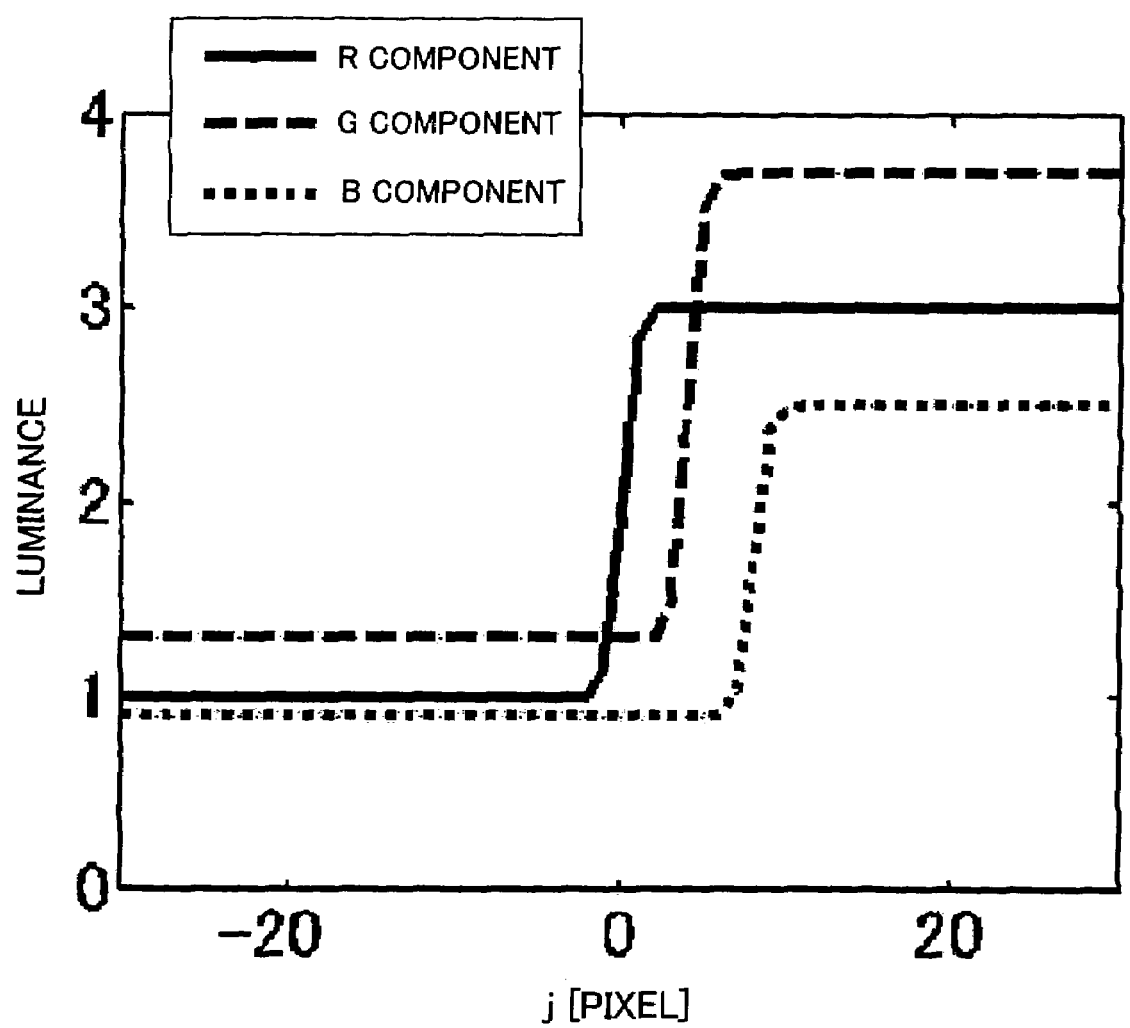
FIG. 4 is an illustrative diagram of R component (a solid line), G component (a broken line), and B component (a dotted line) of an edge model.

$a_1$, $a_2$, $b_1$, $b_2$ are a constant. Dg, Db express the amount of shift at edge positions of G component and B component with respect to R component, respectively (FIG. 4). When the edge positions in RGB are aligned, (Dg=Db=0) is a model where two color areas are adjacent, but when the edge positions are slightly shifted (Dg≠0, Db ≠0), a color shift can be generated on the border part.

Figure 5:
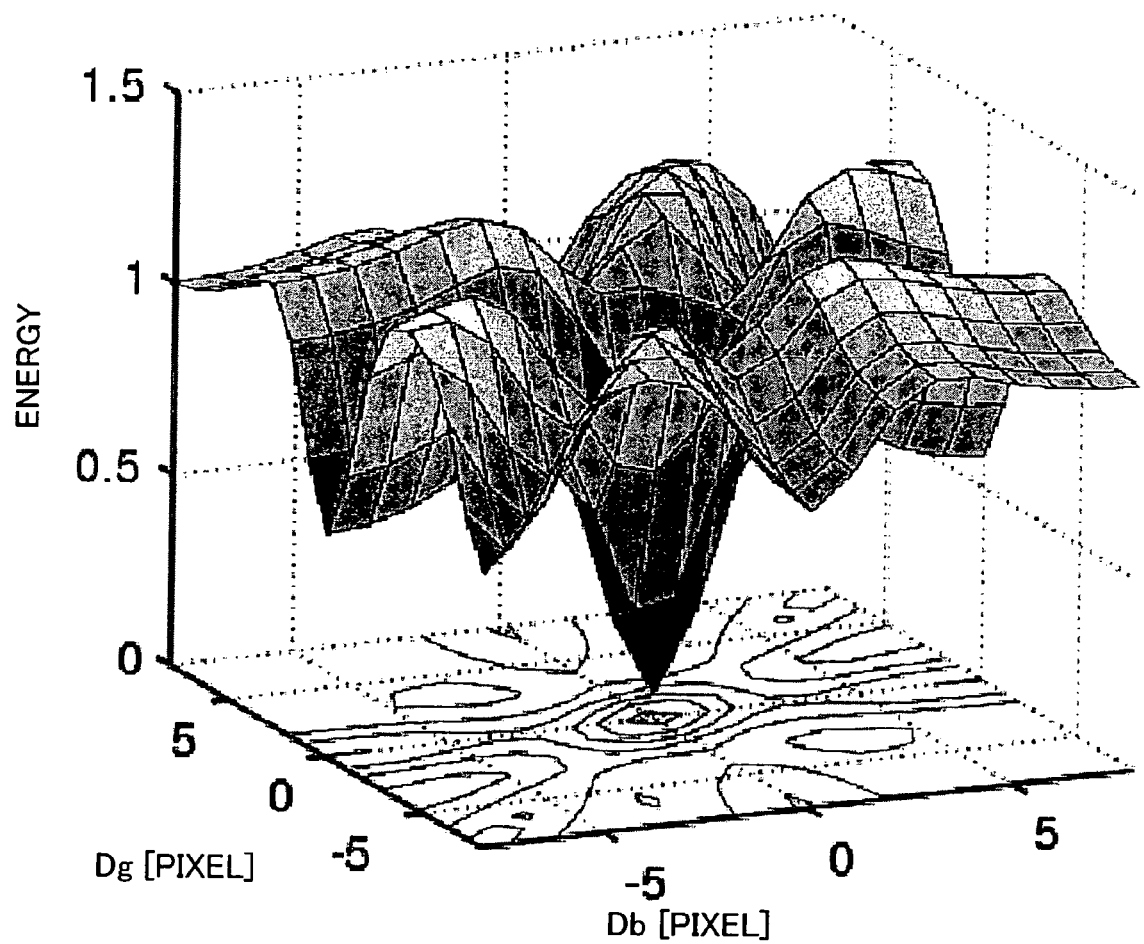
FIG. 5 is a diagram illustrating property of an energy function relating to chrominance.

FIG. 5 shows the variation in the evaluation value $f_3(z_{Cb}, z_{Cr})$ when Dg, Db of a model expressed by Equation 40. Constants are $(a_1, a_2, b_1, b_2) = (1.2, 0.8, 0.1, 0.1)$. FIG. 5 reveals that the evaluation value of the regularization term takes the minimum value when the edge positions are completely matched. It can be easily confirmed that the property of the regularization term like this is held with respect to given $a_1$, $a_2$, $b_1$, $b_2$ of $a_1$, $a_2 > 0$ (it is held when the RGB signals have positive correlations).

Figure 6:
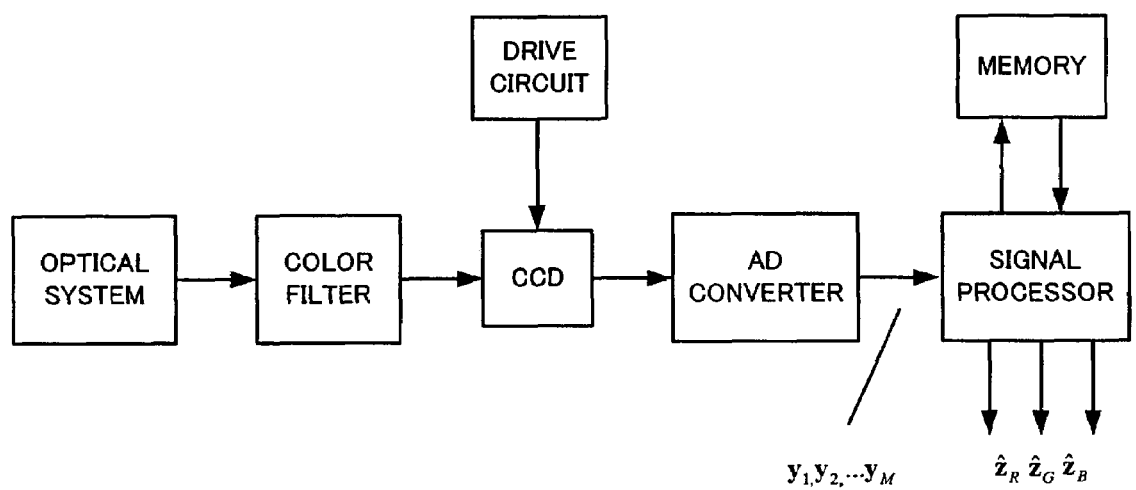
FIG. 6 is a block diagram of an image capturing device using an image processing method according to the invention.

FIG. 6 shows an exemplary configuration of an image capturing device to which the high resolution color image reconstruction method according to the invention is applied. As shown in FIG. 6, the image capturing device to which the invention is applied is configured of an optical system formed of a lens and an optical low-pass filter, a color filter, an image sensor (in the embodiment, a CCD capturing element), a drive circuit which drives the entire image capturing device, an AD converting module, a signal processing module, and memory.

The operation of the image capturing device shown in FIG. 6 is as follows. First, light receiving signals in color mosaic are inputted to a CCD by the optical system and the color filter. Subsequently, continuous image capturing for a fixed time period generates a time series of light receiving signals in the CCD. Then, the time series of the light receiving signals in color mosaic is quantized in the AD converting module, and then stored in the memory. In the signal processing module, multiple color mosaic signals $y_1, y_2, \ldots, y_M$ are combined by a matching process and a super-resolution process, and RGB components $\hat{z}_R$ $\hat{z}_G$ $\hat{z}_B$ of the resulting high resolution image are generated.

Figure 7:
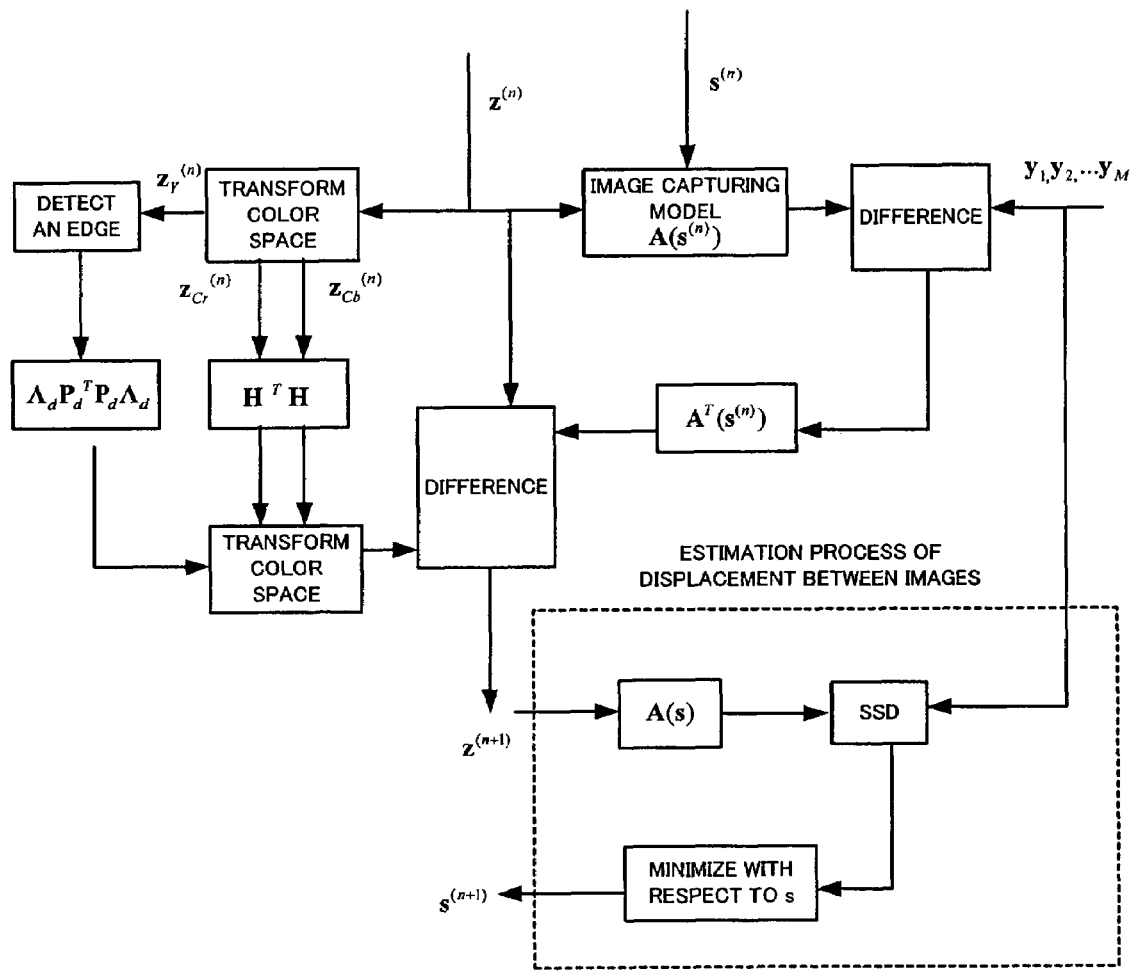
FIG. 7 is a detailed diagram of signal processor shown in FIG. 6.

Next, the detail of the signal process in the signal processor shown in FIG. 6 is shown in FIG. 7. Here, an image reconstruction method for combining a high resolution color image will be described as below with reference to FIG. 7.

Step 1:
Raw image sequence $y_1, \ldots, y_M$ to be input are obtained.

Step 2:
Calibration for sensitivity arrangement $m_c(i_1, i_2)$ is performed when the arrangement of a CFA pattern is unknown.

Step 3:
Input raw image sequence are colored by simple demosaicing using linear interpolation. The displacement of image $d_k = [d_{xk}, d_{yk}]$ is estimated with respect to the luminance component of the obtained color image.

Step 4:
A desired resolution magnification $f$ is set. Then, Equation 34 is optimized. In the invention, various optimization methods can be used. For example, when the steepest-descent method is used as an optimization method, it becomes the subsequent step 5.

Step 5:
Set n=0. A high resolution color image is generated from a single input image to be reference by linear interpolation. This image is set to the initial value $z^{(0)}$ for a reconstructed image.

Step 6:
The weight $\Lambda_d$ for the regularization term $f_2(z_Y)$ is computed by edge direction analysis of the luminance component of the image $z^{(n)}$ (see Reference Literature [7]).

Step 7:

The image $z^{(n)}$ is updated by the following Equations 41 to Equation 44.

$$z^{(n+1)} = z^{(n)} - \alpha \left[ \frac{\partial}{\partial z} \sum_{m=1}^{3} f_m(z) \right]_{z=z^{(n)}} \quad \text{[Equation 41]}$$

$$\left. \frac{\partial f_1(z)}{\partial z} \right|_{z=z^{(n)}} = \sum_{k=1}^{M} A_k^T (A z^{(n)} - y_k) \quad \text{[Equation 42]}$$

$$\left. \frac{\partial f_2(z_Y)}{\partial z} \right|_{z=z^{(n)}} = \sum_{d \in D} T_Y^T \Lambda_d^T P_d^T P_d \Lambda_d T_Y z^{(n)} \quad \text{[Equation 43]}$$

$$\left. \frac{\partial f_3(z_{Cb}, z_{Cr})}{\partial z} \right|_{z=z^{(n)}} = \lambda_c \sum_{C \in \{Cb, Cr\}} T_C^T H^T H T_C z^{(n)} \quad \text{[Equation 44]}$$

Where $T_T$, $T_{Cb}$, $T_{Cr}$ are matrices expressing an operation that determines Y, Cb, and Cr components from the RGB signals, respectively. Since the computation from Equation 41 to Equation 44 can be implemented by the combinations of image processing such as linear filtering, sampling, coordinate transformation, and color space transformation, it is unnecessary to actually perform the matrix operation.

Step 8:

Place n=n+1, and return to step 6.

Step 9:

For the termination condition for repetition computation from step 6 to step 8, convergence of repetition computation is determined, or it is stopped by a predetermined number of times of repetition.

Furthermore, the high resolution color image reconstruction method (image generation method) according to the invention described above can be further expanded to estimate a high resolution image and inter-picture displacement at the same time. This concurrent optimization method (that, is, a concurrent estimation method) is an effective method when the estimation accuracy of displacement between input images is insufficient. The concurrent estimation method of a high resolution image and inter-picture displacement will be described as below.

First, since an evaluation function f(z) is actually a function f(z, s) for an high resolution image and inter-picture displacement, an optimization method that estimates these unknowns at the same time is used to estimate the high resolution image and inter-picture displacement highly accurately.

Subsequently, in order to estimate the high resolution image and inter-picture displacement at the same time, that is, in order to implement concurrent optimization, it is fine to add step A, and step B below after step 8 in the repetition computation described above.

Step A: Image $z^{(n+1)}$ is fixed to estimate the inter-picture displacement s by the following Equation 45.

$$s^{(n+1)} = \underset{s}{\mathrm{argmin}} \| y - A(s) z^{(n+1)} \|^2 \quad \text{[Equation 45]}$$

Step B: Image capturing model $A(s^{(n)})$ is updated to be $A(s^{(n+1)})$.

<5> Experiments for Verifying Effectiveness of the Invention and Experimental Results <5-1> Preparation of Input Image The high resolution color image reconstruction method according to the invention requires multiple images having undergone aliasing with slightly different motion between individual images. Furthermore, each image has to have an overlap area where image reconstruction is applied. In order to generate an input image like this, for example, it is preferable to continuously shoot scenes by holding a digital still camera (or a digital video camera) in slight vibrations.

Moreover, capturing a single still image of text also provides useful information with respect to the high resolution color image reconstruction method according to the invention. Since a text-document-image includes the same letters or words positioned at different places, it can be considered that this is equal to capturing multiple images having different motions.

<5-2> Evaluation by Simulation

Figure 8:
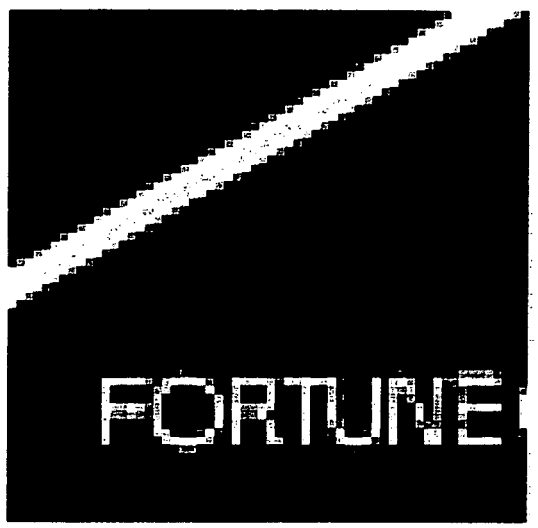
FIG. 8 is a diagram illustrating images used in experiment in the invention.
Figure 8:
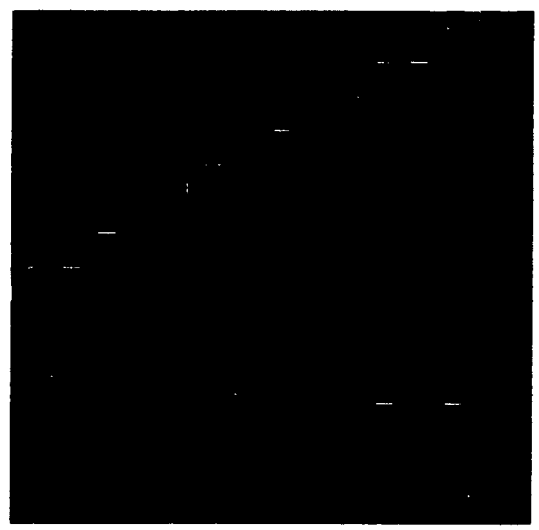

FIG. 8(a) is a standard image (it is also referred to as a reference image) used in simulation. FIG. 8(b) shows a raw color mosaic image generated by simulation from the standard image shown in FIG. 8(a).

Figure 9:
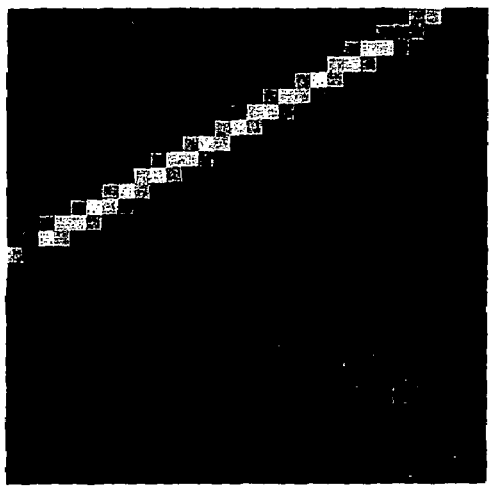
FIG. 9 is a diagram illustrating images reconstructed by the invention.
Figure 9:
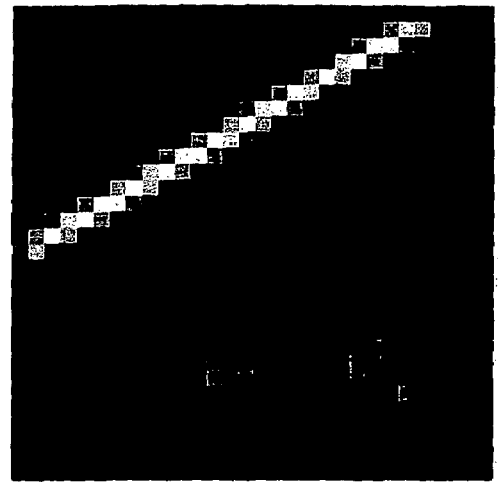
Figure 9:
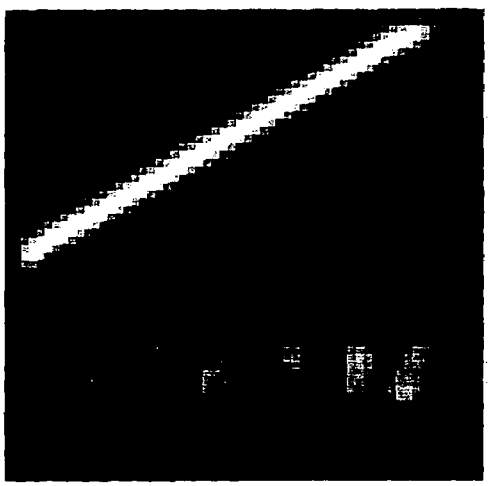
Figure 9:
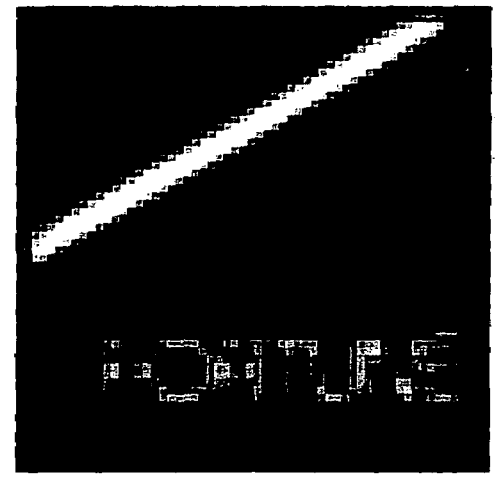

FIG. 9 shows image reconstruction results by the high resolution color image reconstruction method according to the invention under various conditions. FIGS. 9(a), (b), (c) and (d) show four reconstructed images where the number M of input images and the resolution enlargement ratio f are varied. The number of input images in FIGS. 9(a) and (c) is one, and the number of input images in FIGS. 9(b) and (d) is eight. Moreover, the resolution enlargement ratio in FIGS. 9(a) and (b) is one, and the resolution enlargement ratio in FIGS. 9(c) and (d) is two. In the image reconstructed by the high resolution color image reconstruction method according to the invention, it is confirmed that high spatial frequency components are truly reconstructed and the generation of false color is suppressed as well.

In the invention, resolution enlargement is not required, and image reconstruction referred to as multi-frame demosaicing can be performed in the particular case where multiple images can be used (see FIG. 9(b)). Besides, in the actual application of the invention, multiple input images are not always obtained. Also in this case, image reconstruction can be performed from a single input image as a special case of the high resolution color image reconstruction method according to the invention (see FIGS. 9(a) and (c)).

Figure 10:
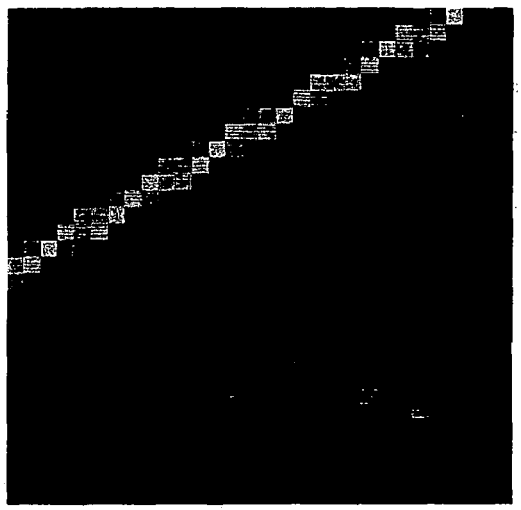
FIG. 10 is a diagram illustrating images reconstructed by traditional method.
Figure 10:
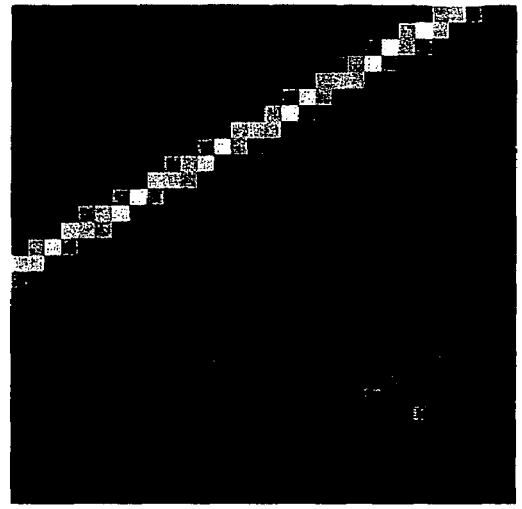
Figure 10:
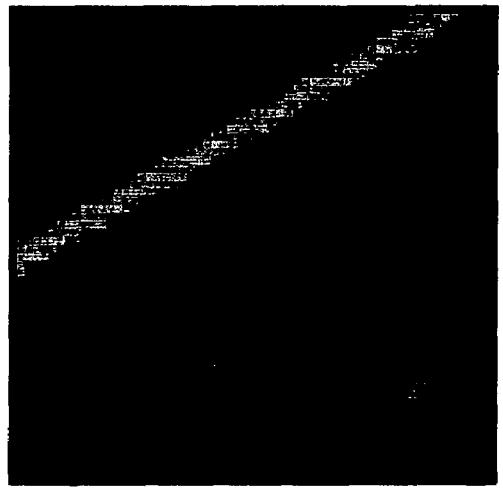
Figure 10:
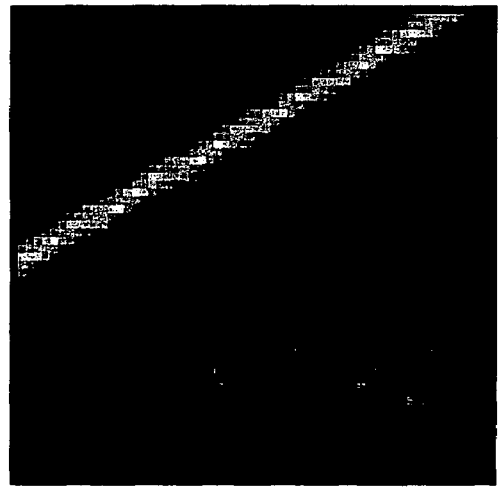

FIG. 10 shows images reconstructed by traditional image reconstruction methods. FIGS. 10(a) and (b) show images reconstructed by typical traditional demosaicing techniques. FIGS. 10(c) and (d) show the results that FIGS. 10(a) and (b) are magnified by linear interpolation and bicubic interpolation, respectively. The magnification is two times both for horizontal and vertical directions. The results shown in FIG. 10 reveal well that high resolution is generated from raw data by a simple process and typical artifacts (blur, false color) are generated.

Figure 11:
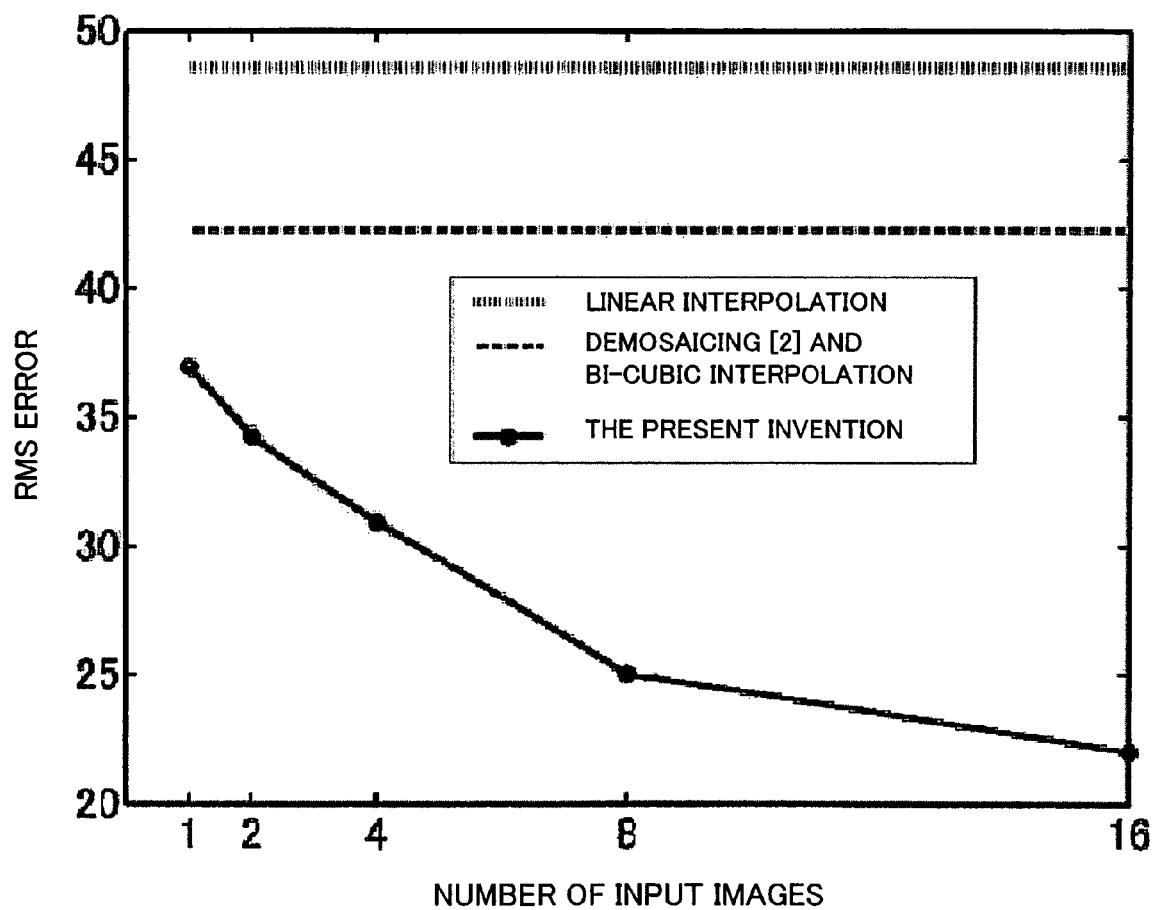
FIG. 11 is a diagram illustrating relationship between RMS error and number of input images.

In the simulation experiment, the error between the standard image and the reconstructed image was computed by an RMS value as quantitative evaluation of the high resolution color image reconstruction method according to the invention. FIG. 11 shows relationship between number of input images and RMS value in the high resolution color image reconstruction method according to the invention. In FIG. 11, RMS values by traditional methods (that is, a single input image underwent demosaicing for magnification) are also shown. As apparent from FIG. 11, particularly when multiple input images are obtained, it is apparent that the effect of image reconstruction by the high resolution color image reconstruction method according to the invention significantly appears.

Figure 12:
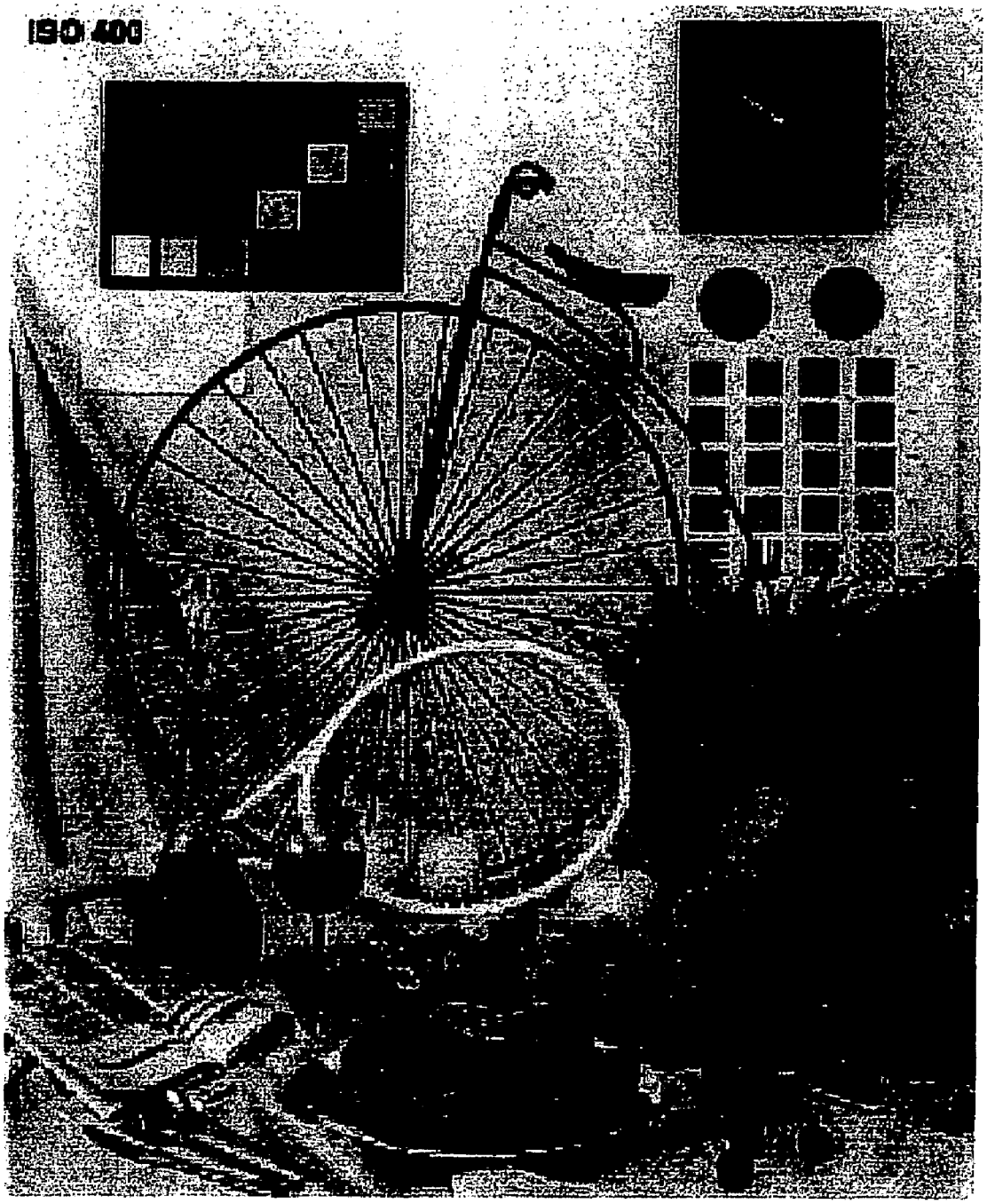
FIG. 12 is a diagram illustrating a reference image used in experiment.
Figure 13:
FIG. 13 is a diagram illustrating a simulated input image used in experiment.
Figure 14:
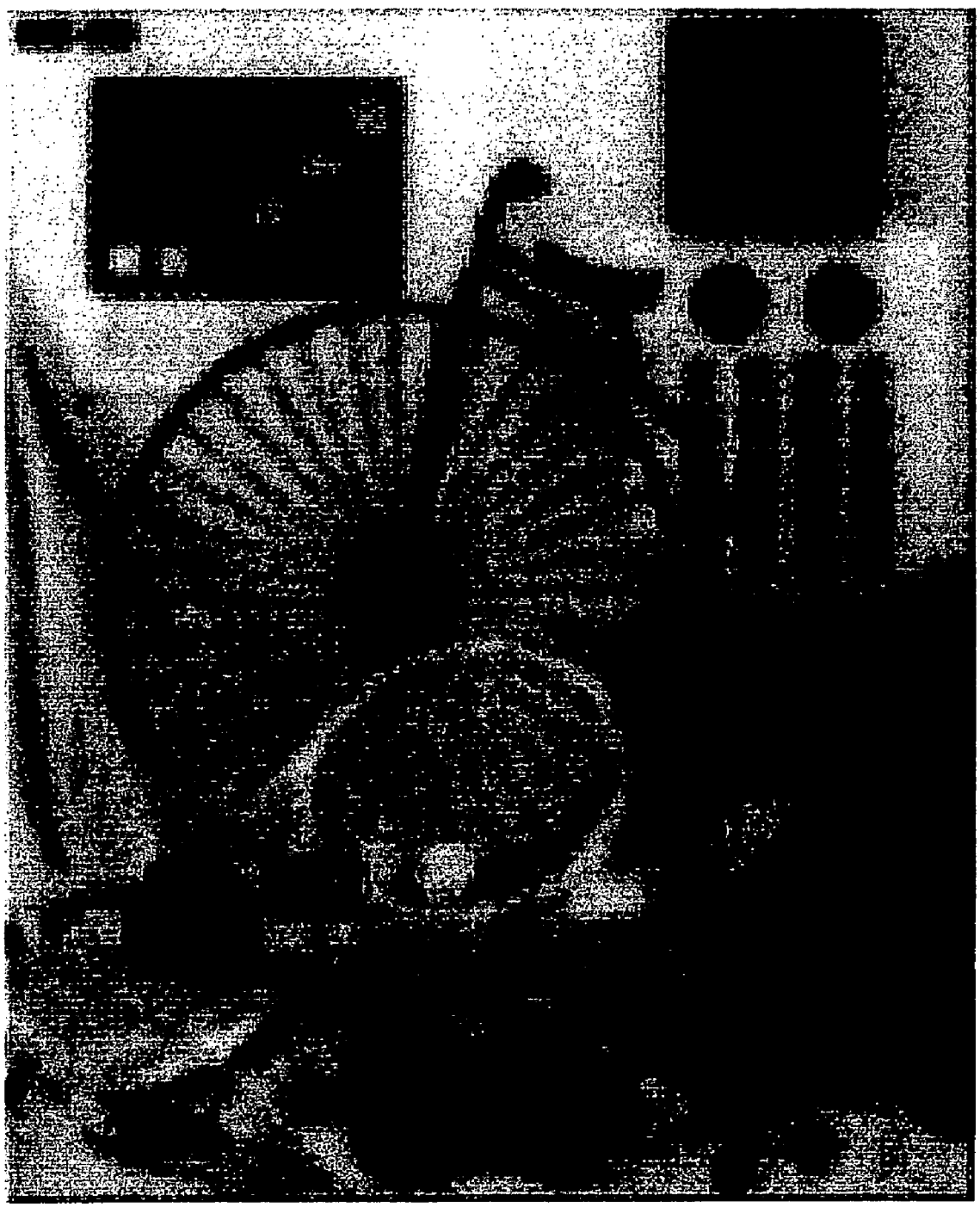
FIG. 14 is a diagram illustrating an image reconstructed by linear interpolation.
Figure 15:
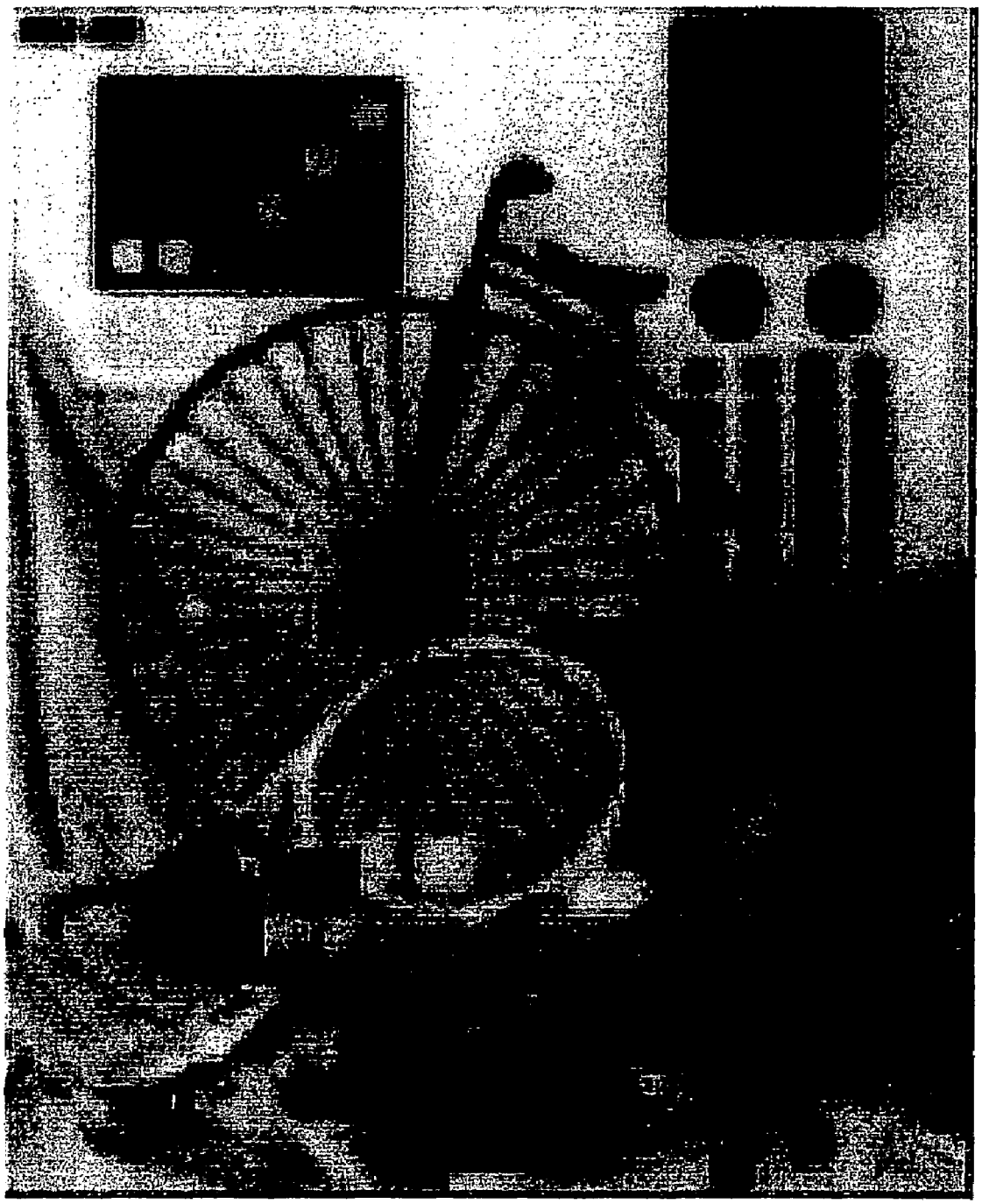
FIG. 15 is a diagram illustrating an image reconstructed by traditional demosaicing method.
Figure 16:
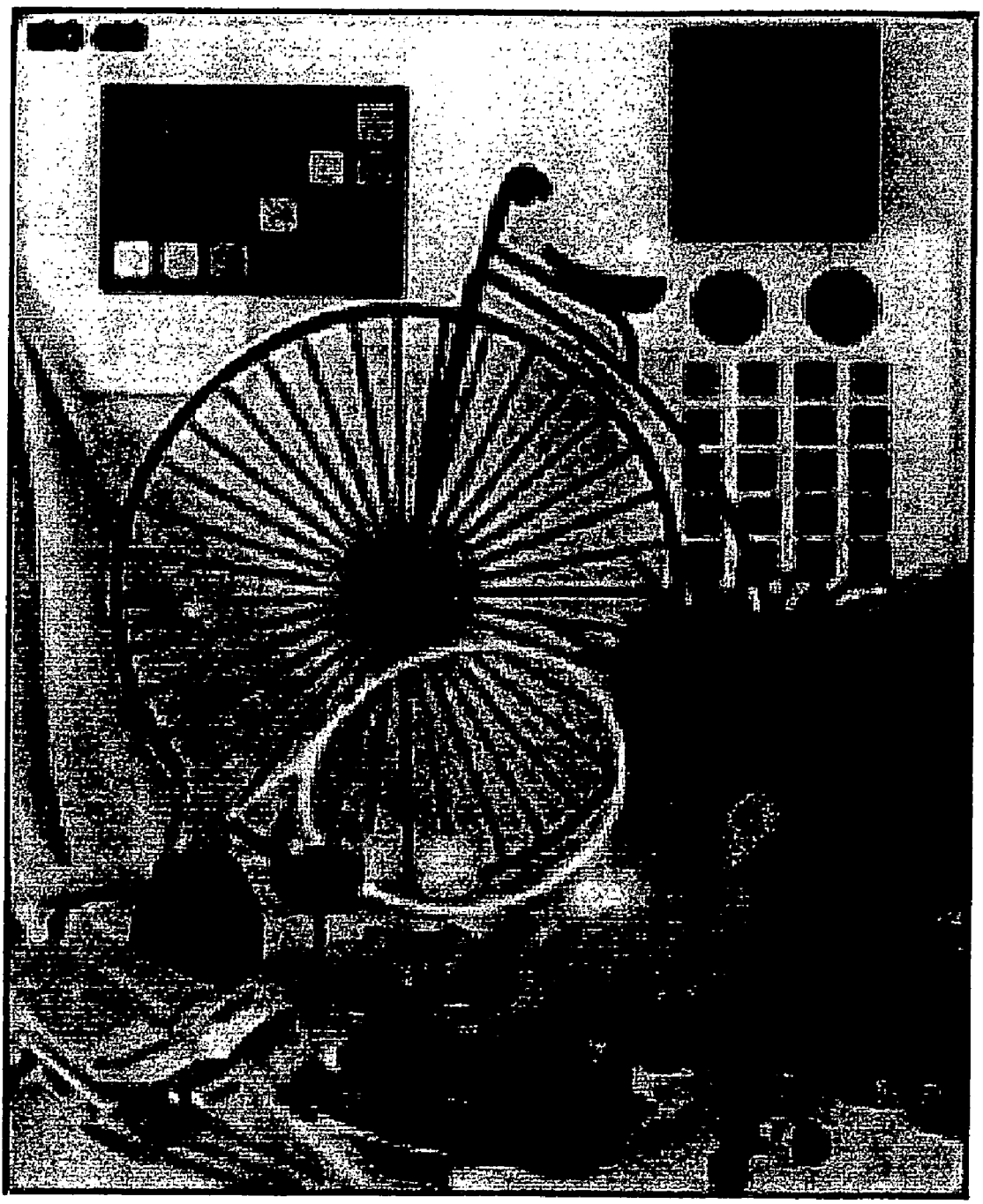
FIG. 16 is a diagram illustrating an image reconstructed by the invention.
Figure 17:
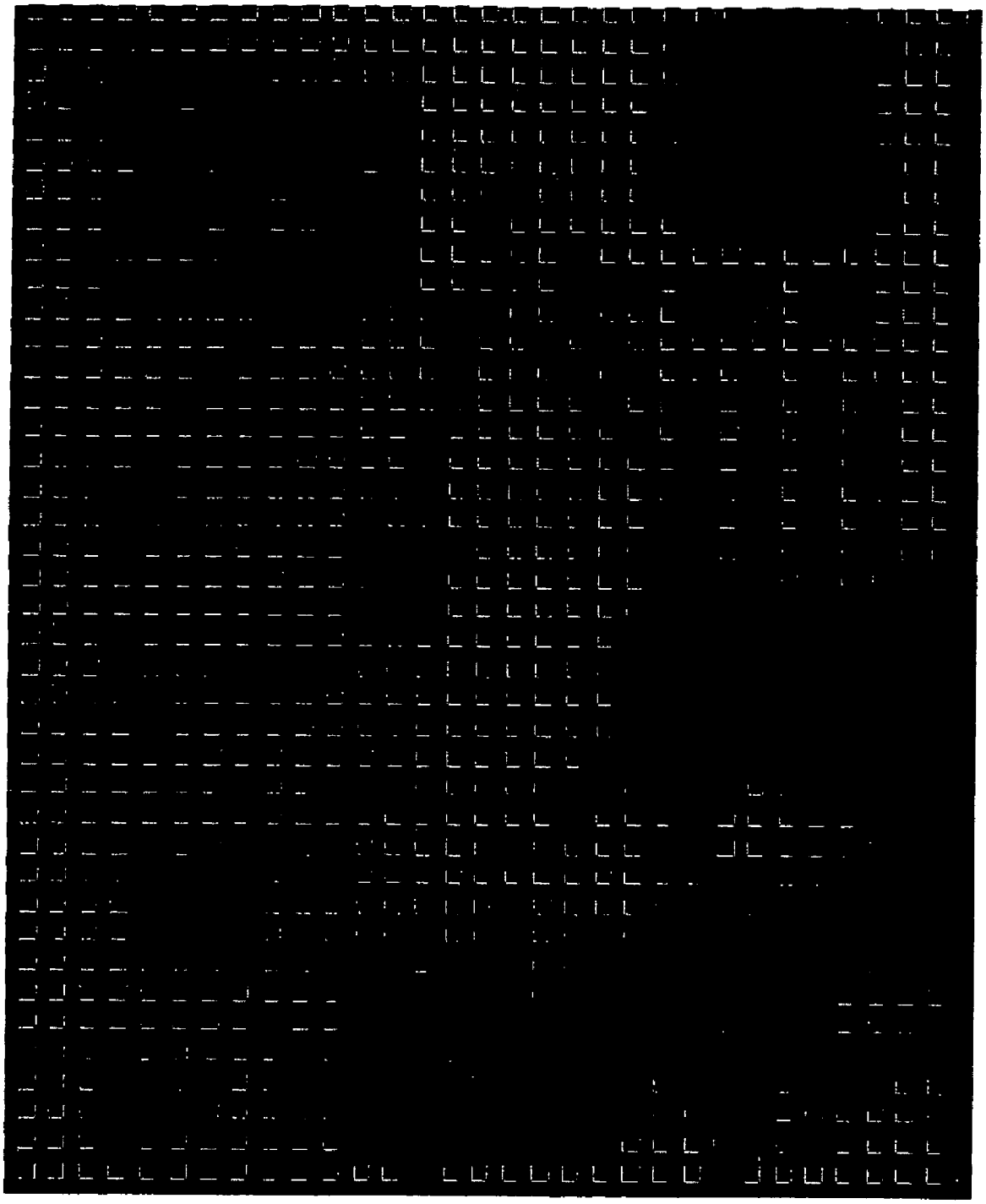
FIG. 17 is a diagram illustrating a simulated input image used in experiment.
Figure 18:
FIG. 18 is a diagram illustrating an image reconstructed by linear interpolation.
Figure 19:
FIG. 19 is a diagram illustrating an image reconstructed by traditional demosaicing method.
Figure 20:
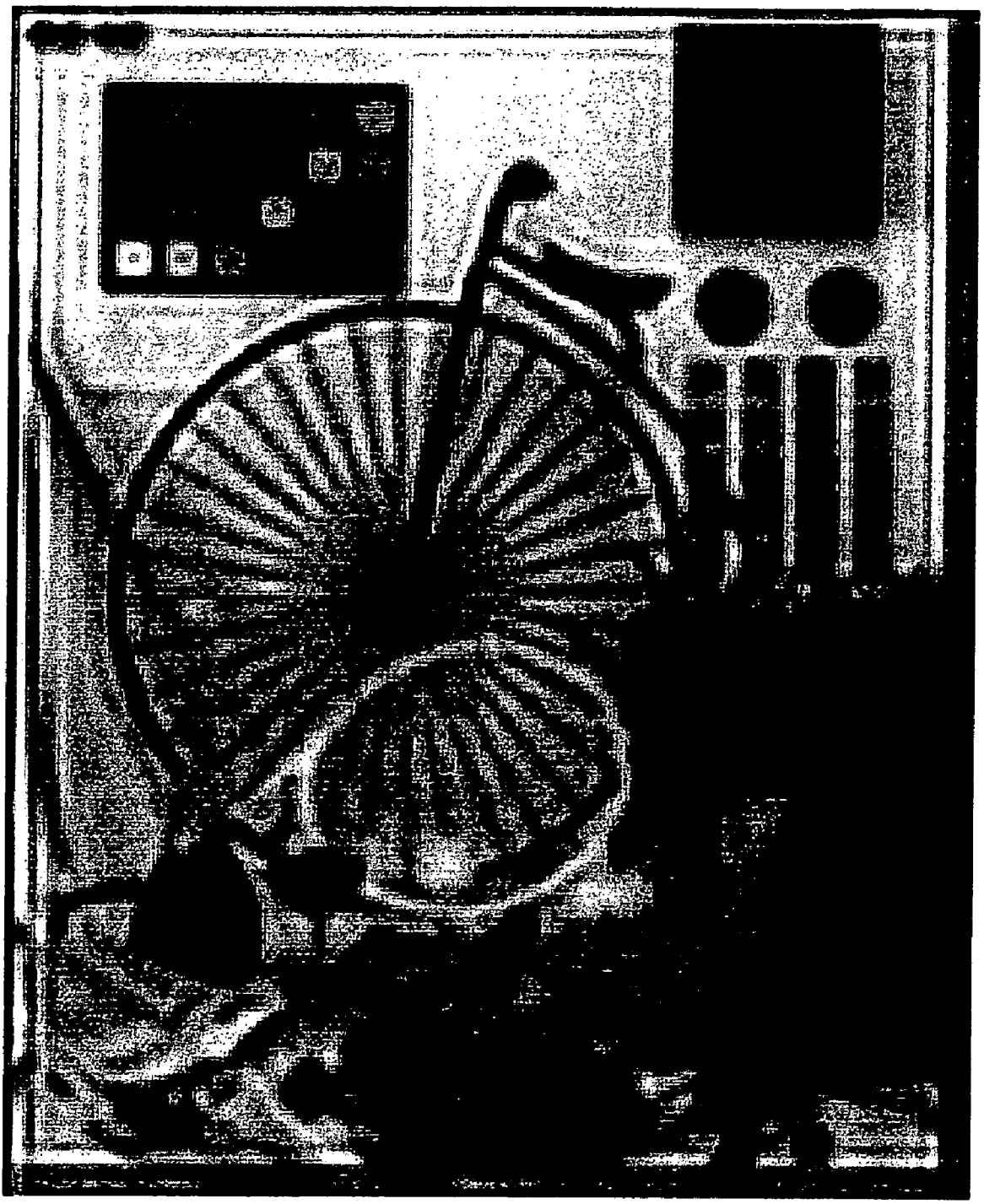
FIG. 20 is a diagram illustrating an image reconstructed by the invention.

Furthermore, through FIGS. 12 to 20, the significant image reconstruction effect according to the invention described above can be further verified. FIG. 12 shows a reference image used in experiments. FIGS. 13 to 16 show the experimental results that resolution is magnified two times. FIG. 13 shows an input image generated by simulation and used in experiments. FIG. 14 shows an image reconstructed by linear interpolation. FIG. 15 shows an image reconstructed by traditional demosaicing method. FIG. 16 shows an image reconstructed by the invention. The number of input images of FIG. 16 is 16. FIGS. 17 to 20 show the experimental results that resolution is magnified four times. FIG. 17 shows an input image generated by simulation and used in experiments. FIG. 18 shows an image reconstructed by linear interpolation. FIG. 19 shows an image reconstructed by traditional demosaicing method. FIG. 20 shows an image reconstructed by the invention. The number of input images in FIG. 20 is 64.

<5-3> Experiment Using Text-document-image

Figure 21:
FIG. 21 is a diagram illustrating experimental results using an image whose subject is a text document (hereinafter referred to as "text-document-image")
Figure 21:
Figure 21:
Figure 21:
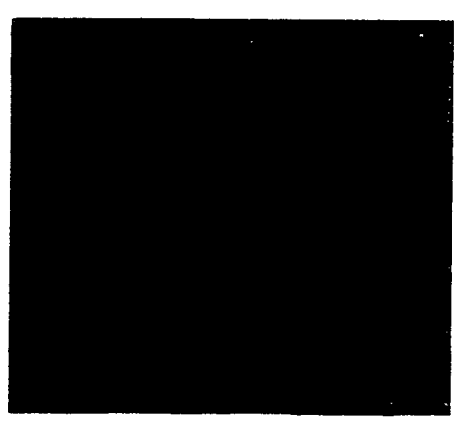

Here, a single-chip CCD camera was actually used to conduct an experiment that reconstructs a high resolution image from moving pictures. FIG. 21(a) shows the first image of input images. A high resolution image to be reconstructed has resolution four times each in the horizontal and vertical directions with respect to the physical resolution of a CCD. FIG. 21(b) and FIG. 21(c) show the resulting images reconstructed by using traditional methods. In the images, FIG. 21(b) shows the resulting image reconstructed by using linear demosaicing and linear interpolation, and FIG. 21(c) shows the resulting image by using Kodak demosaicing and bicubic interpolation.

On the other hand, FIG. 21(d) shows the resulting image reconstructed by using the high resolution color image reconstruction method according to the invention. The number of input images of FIG. 21(d) is 64. It is apparent that by comparing FIGS. 21(b), (c) and (d) with reach other, the high resolution color image reconstruction method according to the invention brings a reconstructed image more highly excellent than that by the traditional methods.

<5-4> Experiment Using Nature-image

Here, the experimental results that various nature-images are subjects are shown. A 3CCD camera was used for image capturing, and raw data filtered by a Bayer filter on a computer was generated in simulation. FIGS. 22(a1), (a2) and (a3) show images in color mosaic as input images. Among them, FIGS. 22(a1) and (a2) show the results that stationary subjects were captured by using shakes of the camera by hands. FIG. 22(a3) shows the result that the camera was fixed to take a subject swinging in winds. In the case of FIG. 22(a3), since the entire image cannot be expressed by uniform motions, motion parameters are estimated with respect to a local block in the image.

In the experiment using true images, the reconstruction accuracy of an image is not always improved, even though many input images are used. The causes can be considered that the position shift between input images has estimation error, that the position shift cannot be accurately expressed by two parameters, and that the luminance is varied over time. Therefore, in the invention, it is preferable to select an input image from available input image sequence by the following criteria.

(1) Images close in time are selected from reference input images in priority.
(2) Images where $d_1$ mod2, $d_2$ mod2, ..., $d_M$ mod2 are uniformly distributed in an area [0,2]×[0,2] are selected in priority.
(3) Images that have a low matching evaluation value (SSD, SAD, etc.) of the images in the estimation of the position shift between the input images are not selected.

FIGS. 22(b1), (b2), (b3), (c1), (c2) and (c3) show the resulting images reconstructed by using traditional methods. Among them, FIGS. 22(b1), (b2) and (b3) show the resulting images reconstructed by using linear demosaicing and linear interpolation. FIGS. 22(c1), (c2) and (c3) show the resulting images reconstructed by using Kodak demosaicing and bicubic interpolation. On the other hand, FIGS. 22(d1), (d2) and (d3) show the resulting images reconstructed by using the high resolution color image reconstruction method according to the invention. The number of input images in FIGS. 22(d1) and (d2) is 64, and the number of input images in FIG. 22(d3) is 16.

Moreover, the reconstructed high resolution images have a resolution four times the physical resolution of the CCD both in the horizontal and vertical directions with respect to in FIGS. 22(b1), (b2), (c1), (c2), (d1) and (d2), and a resolution two times both in the horizontal and vertical directions in FIGS. 22(b3), (c3) and (d3). It was also confirmed from FIG. 22 that the high resolution color image reconstruction method according to the invention exerts significant effects in the experiment using nature-images as well.

<6> Conclusion

The invention is in which the relationship between raw data obtained from the image sensor (for example, the single-chip CCD) and a color image of a desired resolution is formulated by a direct model to reconstruct a high resolution color image. The invention is characterized in that a high resolution color image having a high resolution exceeding a physical resolution decided by the fabrication steps of an image capturing system can be generated afterward. Furthermore, in the invention, the number of input images and a resolution enlargement ratio can be set freely.

In the invention, the CFA pattern is not limited to the Bayer pattern. Other color systems such as any RGB arrangements or complementary color systems can be incorporated into an observation model. More specifically, the application range of the invention is significantly wide because it is a general method having general versatility in that the CFA pattern applicable in the invention is not specialized for the Bayer pattern and the like.

In addition, the high resolution color image reconstruction method according to the invention can be implemented by a computer program executed by a CPU. Furthermore, it is needless to say that the form where the high resolution color image reconstruction method according to the invention is implemented in a hardware is also included in the invention.

Moreover, in the embodiments described above, the CCD capturing element is taken as an example for the image sensor used for the image capturing system (that is, the image capturing device) in the invention. However, it is needles to say that the invention is not limited thereto, which can be applied to image capturing systems using the other single-chip capturing elements such as a MOS type capturing element, and an image capturing tube.

INDUSTRIAL APPLICABILITY

As described above, according to the invention, the following effect can be obtained.

First, the high resolution color image reconstruction method according to the invention can provide improvements in the image signal process based on the efficient use of input image data, and overcome limitation in the physical resolution of an image sensor used in an image capturing device. Since the high resolution color image reconstruction method according to the invention can magnify image resolution to any desired resolutions without changing hardware of the image capturing device, it is expected to greatly contribute to a reduction in fabrication costs of the image capturing device.

Furthermore, the high resolution color image reconstruction method according to the invention is not a simple combination of traditional techniques formed of demosaicing and gray scale super-resolution. The simple, sequential execution of the two types of traditional techniques results only in reconstructing a low quality image. The high resolution color image reconstruction method according to the invention is an effective image reconstruction method in which a single image process can truly reconstruct high spatial frequency components as well as efficiently suppress the generation of false color for reconstructing a high resolution color image.

Moreover, the high resolution color image reconstruction method according to the invention has general versatility that can set the number of input images and the resolution enlargement ratio to any desired numbers. In the special case where resolution does not need to be magnified, image reconstruction referred to as multi-frame demosaicing can also be conducted.

Besides, the invention can be applied to information devices equipped with a general image capturing device or image capturing function using an image sensor and a CFA array (for example, digital still camera, digital video camera, a cellular phone with a camera, a monitor camera, a celestial observation camera, an endoscope microscope, an industrial camera, etc.). In addition, when there is only raw data obtained from an image sensor (for example, a single-chip CCD), a computer program which the high resolution color image reconstruction method according to the invention is the embodiment of software (application) is executed to obtain a high resolution color image of a given desired resolution.

In the invention, when multiple input images are used, it is effective to shoot so as to generate displacement or deformation between input images. In the situations that generate displacement or deformation between the input images, the following cases are acceptable. For example, the case where an image capturing element is mechanically controlled to obtain an input image displaced by a known travel as well as the case where unknown displacement or deformation is generated between a subject and a camera. The typical cases are: the case where a camera is moved by shakes by hands, and the case where a moving subject is captured by a fixed camera. When displacement or deformation between input images is unknown, it can be estimated beforehand, or it can be computed by the concurrent optimization method described above.

REFERENCE LITERATURE

[1] Cok, D. R., "Signal processing method and apparatus for producing interpolated chrominance values in a sampled color image signal", U.S. Pat. No. 4,642,678 (1987)

[2] Laroche, C. A, M. A., Prescott, "Apparatus and method for adaptively interpolating a full color image utilizing chrominance gradients", U.S. Pat. No. 5,373,322 (1994)

[3] T. S. Huang and R. Y. Tsay, "Multiple frame image restoration and registration", in Advances in Computer Vision and Image Processing, Vol. 1, T. S. Huang, Ed. Greenwich, Conn.: JAI, pp. 317-339 (1984)

[4] M. Irani and S. Peleg, "Improving resolution by Image Registration", CVGIP: Graph. Models Image Process, Vol. 53, pp. 231-239, March (1991)

[5] R. C. Hardie, K. J. Barnard and E. E. Amstrong, "Joint MAP Registration and High-Resolution Image Estimation using a Sequence of Undersampled Images", IEEE Trans. on Image Processing, Vol. 6, pp. 1621-1633 (1997)

[6] Masao Shimizu and Masatoshi Okutomi, "Precise sub-pixel estimation on area-based matching", Proc. $8^{th}$ IEEE International Conference on Computer Vision (ICCV2001), (Vancouver, Canada), pp. 90-97, July (2001)

[7] J. Shin, J. Paik, J. R. Price and M. A. Abidi, "Adaptive regularized image interpolation using data fusion and steerable constraints", In SPIE Visual Communications and Image Processing, Vol. 4310, January (2001)

What is claimed is:

1. A high resolution color image reconstruction method which reconstructs a high resolution color image based on a single input image or a sequence of multiple input images captured by an image capturing device employing an image sensor and a color filter array, said high resolution color image reconstruction method characterized by
reconstructing said high resolution color image having a predetermined resolution equal to or larger than a physical resolution of said image capturing device; and comprising the step of:
conducting an image reconstruction process based on prior knowledge that relates to a model of an image capturing system or a subject including known or unknown displacement or deformation generated between said sequence of multiple input images, and then reconstructing said high resolution color image in which even a high spatial frequency component contained in said subject is truly reproduced and occurrence of false color is suppressed.

2. A high resolution color image reconstruction method according to claim 1, wherein in said image reconstruction process, said input image which is obtained from said image capturing device and is a raw data not color interpolated is directly processed.

3. A high resolution color image reconstruction method according to claim 1, wherein in said image reconstruction process, an optimization process of an evaluation function relating to said model of said image capturing system or a color component is conducted.

4. A high resolution color image reconstruction method which reconstructs a high resolution color image based on a single input image or a sequence of multiple input images captured by an image capturing device employing an image sensor and a color filter array, said high resolution color image reconstruction method characterized by
reconstructing said high resolution color image having a predetermined resolution equal to or larger than a physical resolution of said image capturing device; and comprising the step of:
conducting an image reconstruction process based on prior knowledge that relates to a model of an image capturing system or a subject including known or unknown displacement or deformation generated between said sequence of multiple input images, and then reconstructing said high resolution color image in which even a high spatial frequency component contained in said subject is truly reproduced and occurrence of false color is suppressed, wherein in said image reconstruction process, an optimization process of an evaluation function relating to said model of said image capturing system or a color component is conducted, wherein said evaluation function comprises:
a first term which evaluates fidelity of said high resolution color image being an estimated image with respect to said input images by using an image formation model expressing generation of said high resolution color image from said input images;

a second term which evaluates smoothness in said estimated image by penalizing said estimated image within which neighboring pixel values change abruptly in said input images; and a third term which evaluates smoothness of chrominance of said estimated image by penalizing said estimated image within which chrominance components change abruptly in said input images.

5. A high resolution color image reconstruction method according to claim 4, wherein said second term serves to obtain a smooth estimated image with preserved edges; and said third term serves to obtain a smooth estimated image with local chrominance continuity and preserved edges.

6. A high resolution color image reconstruction method according to claim 5, wherein:

said evaluation function is determined by following equation:

$$\hat{z} = \operatorname*{argmin}_{z}\{f_1(z) + af_2(z) + bf_3(z)\};$$

said first term is determined by following equation:

$$f_1(z) = \sum_{k=1}^{M} \|y_k - A_k z\|^2;$$

said second term is determined by following equation:

$$f_2(z) = \|Pz\|^2;$$

said third term is determined by following equation:

$$f_3(z) = \|QTz\|^2,$$

where $y_k$ is a vector which contains pixel values in the k-th image in an input image sequence obtained from said image sensor and said color filter array, M represents the number of images in said input image sequence, z is a vector which contains pixel values in said high resolution color image to be estimated and is composed of vectors $z_R$, $z_G$, $z_B$ which contain pixel values in red, green, and blue channel of z respectively, $\hat{z}$ is a vector which contains pixel values of said high resolution color image obtained by said high resolution color image reconstruction method, $A_k$ is a matrix which relates $y_k$ to z and is determined by properties of said image capturing device, said properties comprises motion between different said input images $y_1, y_2, \ldots, y_M$, a point spread function of said image capturing device, down-sampling factor by said image sensor and said color filter array, P and Q are matrices which serve as adaptive or non-adaptive high-pass filter, T is a matrix which transforms RGB signals to chrominance signals, and a, b are weight parameters which control influence of $f_2(z)$ and $f_3(z)$ respectively.

7. A high resolution color image reconstruction method which reconstructs a high resolution color image based on a single input image or a sequence of multiple input images captured by an image capturing device employing an image sensor and a color filter array, said high resolution color image reconstruction method characterized by reconstructing said high resolution color image having a predetermined resolution equal to or larger than a physical resolution of said image capturing device; and comprising the step of:

conducting an image reconstruction process based on prior knowledge that relates to a model of an image capturing system or a subject including known or unknown displacement or deformation generated between said sequence of multiple input images, and then reconstructing said high resolution color image in which even a high spatial frequency component contained in said subject is truly reproduced and occurrence of false color is suppressed, wherein in said image reconstruction process, an optimization process of an evaluation function relating to said model of said image capturing system or a color component is conducted, wherein said evaluation function is determined by following equations:

$$\hat{z} = \operatorname*{argmin}_{z}\{f_1(z) + f_P(z)\},$$

$$f_1(z) = \sum_{k=1}^{M} \|y_k - A_k z\|^2,$$

$$f_P(z) = f_2(z_Y) + f_3(z_{Cb}, z_{Cr}),$$

$$f_2(z_Y) = \sum_{d \in D} \|\Lambda_d P_d z_Y\|^2,$$

$$f_3(z_{Cb}, z_{Cr}) = \lambda_c (\|H z_{Cb}\|^2 + \|H z_{Cr}\|^2)$$

where:

$y_k$ is a vector which contains pixel values in the k-th image in an input image sequence obtained from said image sensor and said color filter array, M represents the number of images in said input image sequence, z is a vector which contains pixel values in said high resolution color image to be estimated and is composed of vectors $z_R$, $z_G$, $z_B$ which contain pixel values in red, green, and blue channel of z respectively, $\hat{z}$ is a vector which contains pixel values of said high resolution color image obtained by said high resolution color image reconstruction method, $A_k$ is a matrix which relates $y_k$ to z and is determined by properties of said image capturing device, said properties comprises motion between different said input images $y_1, y_2, \ldots, y_M$, a point spread function of said image capturing device, down-sampling factor by said image sensor and said color filter array, $z_y$ is a luminance signal of z, $f_2(z_y)$ is a regularization term for $z_y$, $z_{Cb}$, $z_{Cr}$ are chrominance signals of z, $f_2(z_{Cb}, z_{Cr})$ is a regularization term for $z_{Cb}$, $z_{Cr}$, d is a edge direction in each pixel of $z_y$, i.e. represents any one direction of horizontal, vertical, and diagonal (two ways) directions, no direction (equal to all directions), $P_d$ is a high-pass operator that evaluates smoothness in said edge direction d, $\Lambda_d$ is a diagonal matrix whose element is a weight with respect to a high-pass operation in said edge direction d, H is an isotropic high-pass filter, and $\lambda_c$ is a weighting parameter.

8. A high resolution color image reconstruction method according to claim 1, further comprising the step of:

estimating said displacement or deformation between said input images at the same time as said high resolution color image.

9. A high resolution color image reconstruction apparatus characterized in that it is a single-chip image capturing device employing a single-chip capturing element and using said high resolution color image reconstruction method according to claim 1.

10. A high resolution color image reconstruction apparatus according to claim 9, wherein said single-chip capturing element is a CCD.

11. A high resolution color image reconstruction computer program embodied in a computer-readable medium which reconstructs a high resolution color image based on a single input image or a sequence of multiple input images captured by an image capturing device employing an image sensor and a color filter array, said high resolution color image reconstruction computer program is executable with a computer, comprising the function of:

reconstructing said high resolution color image having a predetermined resolution equal to or larger than a physical resolution of said image capturing device;

and further comprising the function of:

conducting an image reconstruction process based on prior knowledge that relates to a model of an image capturing system or a subject including known or unknown displacement or deformation generated between said sequence of multiple input images, and then reconstructing said high resolution color image in which even a high spatial frequency component contained in said subject is truly reproduced and occurrence of false color is suppressed.

12. A high resolution color image reconstruction computer program embodied in a computer-readable medium according to claim 11, wherein in said image reconstruction process, said input image which is obtained from said image capturing device and is a raw data not color interpolated is directly processed.

13. A high resolution color image reconstruction computer program embodied in a computer-readable medium according to claim 11, wherein in said image reconstruction process, an optimization process of an evaluation function relating to said model of said image capturing system or a color component is conducted.

14. A high resolution color image reconstruction computer program embodied in a computer-readable medium according to claim 13, wherein said evaluation function comprises:

a first term which evaluates fidelity of said high resolution color image being an estimated image with respect to said input images by using an image formation model expressing generation of said high resolution color image from said input images;

a second term which evaluates smoothness in said estimated image by penalizing said estimated image within which neighboring pixel values change abruptly in said input images; and a third term which evaluates smoothness of chrominance of said estimated image by penalizing said estimated image within which chrominance components change abruptly in said input images.

15. A high resolution color image reconstruction computer program embodied in a computer-readable medium according to claim 14, wherein said second term serves to obtain a smooth estimated image with preserved edges; and said third term serves to obtain a smooth estimated image with local chrominance continuity and preserved edges.

16. A high resolution color image reconstruction computer program embodied in a computer-readable medium according to claim 15, wherein:

said evaluation function is determined by following equation:

$$\hat{z} = \arg\min_z \{f_1(z) + af_2(z) + bf_3(z)\};$$

said first term is determined by following equation:

$$f_1(z) = \sum_{k=1}^{M} \|y_k - A_k z\|^2;$$

said second term is determined by following equation:

$$f_2(z) = \|Pz\|^2; \text{ and}$$

said third term is determined by following equation:

$$f_3(z) = \|QTz\|^2,$$

where $y_k$ is a vector which contains pixel values in the k-th image in an input image sequence obtained from said image sensor and said color filter array, M represents the number of images in said input image sequence, z is a vector which contains pixel values in said high resolution color image to be estimated and is composed of vectors $z_R$, $z_G$, $z_B$ which contain pixel values in red, green, and blue channel of z respectively, $\hat{z}$ is a vector which contains pixel values of said high resolution color image obtained by said high resolution color image reconstruction method, $A_k$ is a matrix which relates $y_k$ to z and is determined by properties of said image capturing device, said properties comprises motion between different said input images $y_1, y_2, \ldots, y_M$, a point spread function of said image capturing device, down-sampling factor by said image sensor and said color filter array, P and Q are matrices which serve as adaptive or non-adaptive high-pass filter, T is a matrix which transforms RGB signals to chrominance signals, and a, b are weight parameters which control influence of $f_2(z)$ and $f_3(z)$ respectively.

17. A high resolution color image reconstruction computer program embodied in a computer-readable medium according to claim 13, wherein said evaluation function is determined by following equations:

$$\hat{z} = \arg\min_z \{f_1(z) + f_P(z)\},$$

$$f_1(z) = \sum_{k=1}^{M} \|y_k - A_k z\|^2,$$

$$f_P(z) = f_2(z_Y) + f_3(z_{Cb}, z_{Cr}),$$

-continued $$f_2(z_Y) = \sum_{d \in D} \|\Lambda_d P_d z_Y\|^2,$$

$$f_3(z_{Cb}, z_{Cr}) = \lambda_c(\|H z_{Cb}\|^2 + \|H z_{Cr}\|^2)$$

where:
$y_k$ is a vector which contains pixel values in the k-th image in an input image sequence obtained from said image sensor and said color filter array, M represents the number of images in said input image sequence, z is a vector which contains pixel values in said high resolution color image to be estimated and is composed of vectors $z_R$, $z_G$, $z_B$ which contain pixel values in red, green, and blue channel of z respectively, $\hat{z}$ is a vector which contains pixel values of said high resolution color image obtained by said high resolution color image reconstruction method, $A_k$ is a matrix which relates $y_k$ to z and is determined by properties of said image capturing device, said properties comprises motion between different said input images $y_1, y_2, \ldots, y_M$, a point spread function of said image capturing device, down-sampling factor by said image sensor and said color filter array, $z_y$ is a luminance signal of z, $f_2(z_y)$ is a regularization term for $z_y$, $z_{Cb}, z_{Cr}$ are chrominance signals of z, $f_2(z_{Cb}, z_{Cr})$ is a regularization term for $z_{Cb}, z_{Cr}$, d is a edge direction in each pixel of $z_y$, i.e. represents any one direction of horizontal, vertical, and diagonal (two ways) directions, no direction (equal to all directions), $P_d$ is a high-pass operator that evaluates smoothness in said edge direction d, $\Lambda_d$ is a diagonal matrix whose element is a weight with respect to a high-pass operation in said edge direction d, H is an isotropic high-pass filter, and $\lambda_c$ is a weighting parameter.

18. A high resolution color image reconstruction computer program embodied in a computer-readable medium according to claim 11, further comprising the function of:
estimating said displacement or deformation between said input images at the same time as said high resolution color image.

19. A high resolution color image reconstruction method according to claim 2, further comprising the step of:
estimating said displacement or deformation between said input images at the same time as said high resolution color image.

20. A high resolution color image reconstruction method according to claim 3, further comprising the step of:
estimating said displacement or deformation between said input images at the same time as said high resolution color image.

21. A high resolution color image reconstruction method according to claim 4, further comprising the step of:
estimating said displacement or deformation between said input images at the same time as said high resolution color image.

22. A high resolution color image reconstruction method according to claim 5, further comprising the step of:
estimating said displacement or deformation between said input images at the same time as said high resolution color image.

23. A high resolution color image reconstruction method according to claim 6, further comprising the step of:
estimating said displacement or deformation between said input images at the same time as said high resolution color image.

24. A high resolution color image reconstruction method according to claim 7, further comprising the step of:
estimating said displacement or deformation between said input images at the same time as said high resolution color image.

25. A high resolution color image reconstruction apparatus characterized in that it is a single-chip image capturing device employing a single-chip capturing element and using said high resolution color image reconstruction method according to claim 2.

26. A high resolution color image reconstruction apparatus characterized in that it is a single-chip image capturing device employing a single-chip capturing element and using said high resolution color image reconstruction method according to claim 3.

27. A high resolution color image reconstruction apparatus characterized in that it is a single-chip image capturing device employing a single-chip capturing element and using said high resolution color image reconstruction method according to claim 4.

28. A high resolution color image reconstruction apparatus characterized in that it is a single-chip image capturing device employing a single-chip capturing element and using said high resolution color image reconstruction method according to claim 5.

29. A high resolution color image reconstruction apparatus characterized in that it is a single-chip image capturing device employing a single-chip capturing element and using said high resolution color image reconstruction method according to claim 6.

30. A high resolution color image reconstruction apparatus characterized in that it is a single-chip image capturing device employing a single-chip capturing element and using said high resolution color image reconstruction method according to claim 7.

31. A high resolution color image reconstruction apparatus characterized in that it is a single-chip image capturing device employing a single-chip capturing element and using said high resolution color image reconstruction method according to claim 8.

32. A high resolution color image reconstruction computer program embodied in a computer-readable medium according to claim 12, further comprising the function of:
estimating said displacement or deformation between said input images at the same time as said high resolution color image.

33. A high resolution color image reconstruction computer program embodied in a computer-readable medium according to claim 13, further comprising the function of:
estimating said displacement or deformation between said input images at the same time as said high resolution color image.

34. A high resolution color image reconstruction computer program embodied in a computer-readable medium according to claim 14, further comprising the function of:
estimating said displacement or deformation between said input images at the same time as said high resolution color image.

35. A high resolution color image reconstruction computer program embodied in a computer-readable medium according to claim 15, further comprising the function of:

estimating said displacement or deformation between said input images at the same time as said high resolution color image.

36. A high resolution color image reconstruction computer program embodied in a computer-readable medium according to claim 16, further comprising the function of:

estimating said displacement or deformation between said input images at the same time as said high resolution color image.

37. A high resolution color image reconstruction computer program embodied in a computer-readable medium according to claim 17, further comprising the function of:

estimating said displacement or deformation between said input images at the same time as said high resolution color image.

* * * * *

UNITED STATES PATENT AND TRADEMARK OFFICE
CERTIFICATE OF CORRECTION

PATENT NO. : 7,515,747 B2
APPLICATION NO. : 10/543846
DATED : April 7, 2009
INVENTOR(S) : Masatoshi Okutomi et al.

It is certified that error appears in the above-identified patent and that said Letters Patent is hereby corrected as shown below:

Title Page, Section (73) Assignee should read
-- TOKYO INSTITUTE OF TECHNOLOGY, Tokyo (JP) --.

Signed and Sealed this

Twenty-sixth Day of January, 2010

David J. Kappos
*Director of the United States Patent and Trademark Office*